US008601549B2

(12) United States Patent (10) Patent No.: US 8,601,549 B2
Dickerson (45) Date of Patent: Dec. 3, 2013

(54) CONTROLLING ACCESS TO A RESOURCE USING AN ATTRIBUTE BASED ACCESS CONTROL LIST

(75) Inventor: Robert Scott Dickerson, Cary, NC (US)

(73) Assignee: McKesson Financial Holdings, Hamilton (BM)

( * ) Notice: Subject to any disclaimer, the term of this patent is extended or adjusted under 35 U.S.C. 154(b) by 415 days.

(21) Appl. No.: 12/825,979

(22) Filed: Jun. 29, 2010

(65) Prior Publication Data

US 2011/0321135 A1 Dec. 29, 2011

(51) Int. Cl.
*G06F 7/04* (2006.01)

(52) U.S. Cl.
USPC ........ 726/4; 726/27; 726/28; 726/29; 726/30; 726/26

(58) Field of Classification Search
USPC .................................................. 726/26–30, 4
See application file for complete search history.

(56) References Cited

U.S. PATENT DOCUMENTS

| | | | | |
|---|---|---|---|---|
| 6,584,582 | B1 * | 6/2003 | O'Connor | 714/21 |
| 7,203,709 | B2 * | 4/2007 | Long et al. | 707/1 |
| 7,984,066 | B1 * | 7/2011 | Kilday et al. | 707/781 |
| 8,015,204 | B2 * | 9/2011 | Kaler et al. | 707/783 |
| 2006/0129522 | A1 * | 6/2006 | Itterbeck et al. | 707/1 |
| 2007/0124482 | A1 * | 5/2007 | Lee et al. | 709/228 |
| 2007/0143242 | A1 * | 6/2007 | Miller et al. | 707/1 |
| 2007/0198456 | A1 * | 8/2007 | Betz et al. | 707/1 |
| 2007/0255743 | A1 * | 11/2007 | Gaucas | 707/102 |
| 2007/0283443 | A1 * | 12/2007 | McPherson et al. | 726/26 |
| 2008/0172720 | A1 * | 7/2008 | Botz et al. | 726/3 |
| 2008/0313703 | A1 * | 12/2008 | Flaks et al. | 726/2 |
| 2009/0064342 | A1 * | 3/2009 | Chan et al. | 726/27 |
| 2009/0077087 | A1 * | 3/2009 | Urano et al. | 707/9 |
| 2009/0112967 | A1 * | 4/2009 | Amano et al. | 709/201 |
| 2010/0036846 | A1 * | 2/2010 | Rafiq et al. | 707/9 |
| 2010/0192211 | A1 * | 7/2010 | Bono et al. | 726/7 |
| 2010/0281060 | A1 * | 11/2010 | Ahmed et al. | 707/785 |
| 2011/0126281 | A1 * | 5/2011 | Ben-Zvi et al. | 726/21 |
| 2011/0173679 | A1 * | 7/2011 | Perumal et al. | 726/4 |
| 2012/0030242 | A1 * | 2/2012 | Nakamura et al. | 707/781 |

* cited by examiner

*Primary Examiner* — Haresh N Patel
(74) *Attorney, Agent, or Firm* — Alston & Bird LLP

(57) ABSTRACT

Methods, apparatuses, and computer program products are provided for controlling access to a resource. A method may include determining one or more request attributes associated with a request for access to the resource. The method may further include accessing an access control list associated with the resource. The access control list may include one or more access control attributes associated with the resource. The method may additionally include determining a permission defining one or more access abilities for the resource at least in part by comparing the request attributes to the access control attributes and, for any access control attribute corresponding to a request attribute, including an ability associated with the corresponding access control attribute in the permission. The method may also include determining whether to grant the request based at least in part on the determined permission. Corresponding apparatuses and computer program products are also provided.

22 Claims, 13 Drawing Sheets

CONTROLLING ACCESS TO A RESOURCE USING AN ATTRIBUTE BASED ACCESS CONTROL LIST

TECHNOLOGICAL FIELD

Embodiments of the present invention relate generally to resource security and, more particularly, relate to methods, apparatuses, and computer program products for controlling access to a resource.

BACKGROUND

In the modern computing age, computers are often networked. In this regard, resources stored on a networked computer may be accessible to and/or vulnerable to attack from any computer or user of a computer on the network. Accordingly, securing networked computers may be important to prevent unauthorized users from accessing a resource of a networked computer. In this regard, computing resources are often intended to be accessed only by certain users. For example, a system administrator may define access permissions for system resources so as to restrict access to certain users or groups of users. Further, even a user having a right to access a resource may only be intended to have a certain subset of access abilities for the resource. For example, a system administrator may intend for a user to have the ability to execute a resource, but not to have the ability to write to the resource.

However, existing security models may be inefficient and may not provide sufficient scalability to allow implementation on a system with a large number of resources that may be accessed by a large number of users. For example, existing security models may be particularly unsuited for implementation on networked computers, which may, for example, function as data warehouses having a large number of resources, such as documents, applications, and/or the like. In this regard, providing resource level security on such a system using existing security models may be burdensome to a system administrator and may be inefficient from the standpoint of the processing and hardware resources required for implementation.

BRIEF SUMMARY OF SOME EXAMPLES OF THE INVENTION

Methods, apparatuses, and computer program products are herein provided for controlling access to a resource. These methods, apparatuses, and computer program products may provide several advantages to system administrators, computing system users, and computing systems implementing various example embodiments. In this regard, some example embodiments provide an access control model providing resource level security in a manner that may be less burdensome on system administrators and may be less processing intensive, thereby enhancing scalability on systems having a large number of resources and/or that are accessible by a large number of users. For example, some example embodiments enable resources to be organized within a hierarchy of one or more collections such that a resource may inherit access abilities associated with a containing collection(s). Accordingly, a system administrator may at least partially define access abilities for a resource by organizing the resource within a collection already having defined access abilities.

Further, some example embodiments may provide for determination of a permission for a request for access to a resource by iteratively comparing a request attribute to access control attributes of a hierarchy of access control lists until an access control attribute corresponding to the request attribute is found or the access control list associated with a root collection in a hierarchy of one or more collections in which the resource is contained is reached. In this regard, the iterative attribute comparison process provided by some example embodiments may facilitate inheritance of access abilities. Additionally, some example embodiments may provide for determination of whether to grant a request to access a resource based on a plurality of request attributes. Accordingly, a determination as to whether to grant access to a resource may be made based on the interaction of a plurality of request attributes, thus enabling more complex resource level security definitions to be set forth by system administrators. In this regard, such example embodiments may, for example, determine a permission for a request by performing an iterative attribute comparison process for each request attribute associated with the request.

Additionally, some example embodiments may reduce the burden on processing resources when compared to existing security models. In this regard, some example embodiments may leverage a cached access control model when determining whether to grant a request for access to a resource. Accordingly, such example embodiments may avoid repeated calls to a security database when determining whether a request should be granted.

In a first example embodiment, a method for controlling access to a resource is provided. The method of this embodiment comprises determining one or more request attributes associated with a request for access to the resource. The method of this embodiment further comprises accessing an access control list associated with the resource. The access control list of this embodiment comprises one or more access control attributes associated with the resource. The method of this embodiment additionally comprises determining a permission defining one or more access abilities for the resource at least in part by comparing the request attributes to the access control attributes and, for any access control attribute corresponding to a request attribute, including an ability associated with the corresponding access control attribute in the permission. The method of this embodiment also comprises determining whether to grant the request based at least in part on the determined permission.

In another example embodiment, an apparatus for controlling access to a resource is provided. The apparatus of this embodiment comprises at least one processor. The at least one processor is configured to cause the apparatus of this embodiment to determine one or more request attributes associated with a request for access to the resource. The at least one processor is further configured to cause the apparatus of this embodiment to access an access control list associated with the resource. The access control list of this embodiment comprises one or more access control attributes associated with the resource. The at least one processor is additionally configured to cause the apparatus of this embodiment to determine a permission defining one or more access abilities for the resource at least in part by comparing the request attributes to the access control attributes and, for any access control attribute corresponding to a request attribute, including an ability associated with the corresponding access control attribute in the permission. The at least one processor is also configured to cause the apparatus of this embodiment to determine whether to grant the request based at least in part on the determined permission.

In another example embodiment, a computer program product for controlling access to a resource is provided. The computer program product of this embodiment includes at least one tangible computer-readable storage medium having computer-readable program instructions stored therein. The program instructions of this embodiment comprise program instructions configured to determine one or more request attributes associated with a request for access to the resource. The program instructions of this embodiment further comprise program instructions configured to access an access control list associated with the resource. The access control list of this embodiment comprises one or more access control attributes associated with the resource. The program instructions of this embodiment additionally comprise program instructions configured to determine a permission defining one or more access abilities for the resource at least in part by comparing the request attributes to the access control attributes and, for any access control attribute corresponding to a request attribute, including an ability associated with the corresponding access control attribute in the permission. The program instructions of this embodiment also comprise program instructions configured to determine whether to grant the request based at least in part on the determined permission.

In another example embodiment, an apparatus for controlling access to a resource is provided. The apparatus of this embodiment comprises means for determining one or more request attributes associated with a request for access to the resource. The apparatus of this embodiment further comprises means for accessing an access control list associated with the resource. The access control list of this embodiment comprises one or more access control attributes associated with the resource. The apparatus of this embodiment additionally comprises means for determining a permission defining one or more access abilities for the resource at least in part by comparing the request attributes to the access control attributes and, for any access control attribute corresponding to a request attribute, including an ability associated with the corresponding access control attribute in the permission. The apparatus of this embodiment also comprises means for determining whether to grant the request based at least in part on the determined permission.

In another example embodiment, a method for controlling access to a resource contained within a hierarchy of one or more collections is provided. The method of this embodiment comprises determining a request attribute associated with a request for access to the resource. The method of this embodiment further comprises accessing an access control model comprising a hierarchy of linked access control lists. The hierarchy of linked access control lists of this embodiment comprises an access control list associated with the resource and one or more additional access control lists. Each additional access control list of this embodiment is associated with a respective one of the one or more collections and comprises one or more access control attributes. The method of this embodiment additionally comprises iteratively accessing the access control lists in the hierarchy of linked access control lists beginning with the access control list associated with the resource and proceeding to an access control list associated with a root collection in the hierarchy of collections and comparing the request attribute to the access control attributes in each accessed access control list until an access control attribute associated with the request attribute is found or until the access control list associated with the root collection is reached. The method of this embodiment also comprises, in an instance in which an access control attribute corresponding to the request attribute is found, accumulating an ability associated with the corresponding access control attribute in a permission used to determine whether to grant the request.

In another example embodiment, an apparatus for controlling access to a resource contained within a hierarchy of one or more collections is provided. The apparatus of this embodiment comprises at least one processor. The at least one processor is configured to cause the apparatus of this embodiment to determine a request attribute associated with a request for access to the resource. The at least one processor is further configured to cause the apparatus of this embodiment to access an access control model comprising a hierarchy of linked access control lists. The hierarchy of linked access control lists of this embodiment comprises an access control list associated with the resource and one or more additional access control lists. Each additional access control list of this embodiment is associated with a respective one of the one or more collections and comprises one or more access control attributes. The at least one processor is additionally configured to cause the apparatus of this embodiment to iteratively access the access control lists in the hierarchy of linked access control lists beginning with the access control list associated with the resource and proceeding to an access control list associated with a root collection in the hierarchy of collections and compare the request attribute to the access control attributes in each accessed access control list until an access control attribute associated with the request attribute is found or until the access control list associated with the root collection is reached. The at least one processor is also configured to cause the apparatus of this embodiment, in an instance in which an access control attribute corresponding to the request attribute is found, to accumulate an ability associated with the corresponding access control attribute in a permission used to determine whether to grant the request.

In another example embodiment, a computer program product for controlling access to a resource contained within a hierarchy of one or more collections is provided. The computer program product of this embodiment includes at least one tangible computer-readable storage medium having computer-readable program instructions stored therein. The program instructions of this embodiment comprise program instructions configured to determine a request attribute associated with a request for access to the resource. The program instructions of this embodiment further comprise program instructions configured to access an access control model comprising a hierarchy of linked access control lists. The hierarchy of linked access control lists of this embodiment comprises an access control list associated with the resource and one or more additional access control lists. Each additional access control list of this embodiment is associated with a respective one of the one or more collections and comprises one or more access control attributes. The program instructions of this embodiment additionally comprise program instructions configured to iteratively access the access control lists in the hierarchy of linked access control lists beginning with the access control list associated with the resource and proceeding to an access control list associated with a root collection in the hierarchy of collections and compare the request attribute to the access control attributes in each accessed access control list until an access control attribute associated with the request attribute is found or until the access control list associated with the root collection is reached. The program instructions of this embodiment also comprise program instructions configured, in an instance in which an access control attribute corresponding to the request attribute is found, to accumulate an ability associated with the corresponding access control attribute in a permission used to determine whether to grant the request.

In another example embodiment, an apparatus for controlling access to a resource contained within a hierarchy of one or more collections is provided. The apparatus of this embodiment comprises means for determining a request attribute associated with a request for access to the resource. The apparatus of this embodiment further comprises means for accessing an access control model comprising a hierarchy of linked access control lists. The hierarchy of linked access control lists of this embodiment comprises an access control list associated with the resource and one or more additional access control lists. Each additional access control list of this embodiment is associated with a respective one of the one or more collections and comprises one or more access control attributes. The apparatus of this embodiment additionally comprises means for iteratively accessing the access control lists in the hierarchy of linked access control lists beginning with the access control list associated with the resource and proceeding to an access control list associated with a root collection in the hierarchy of collections and comparing the request attribute to the access control attributes in each accessed access control list until an access control attribute associated with the request attribute is found or until the access control list associated with the root collection is reached. The apparatus of this embodiment also comprises means for, in an instance in which an access control attribute corresponding to the request attribute is found, accumulating an ability associated with the corresponding access control attribute in a permission used to determine whether to grant the request.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
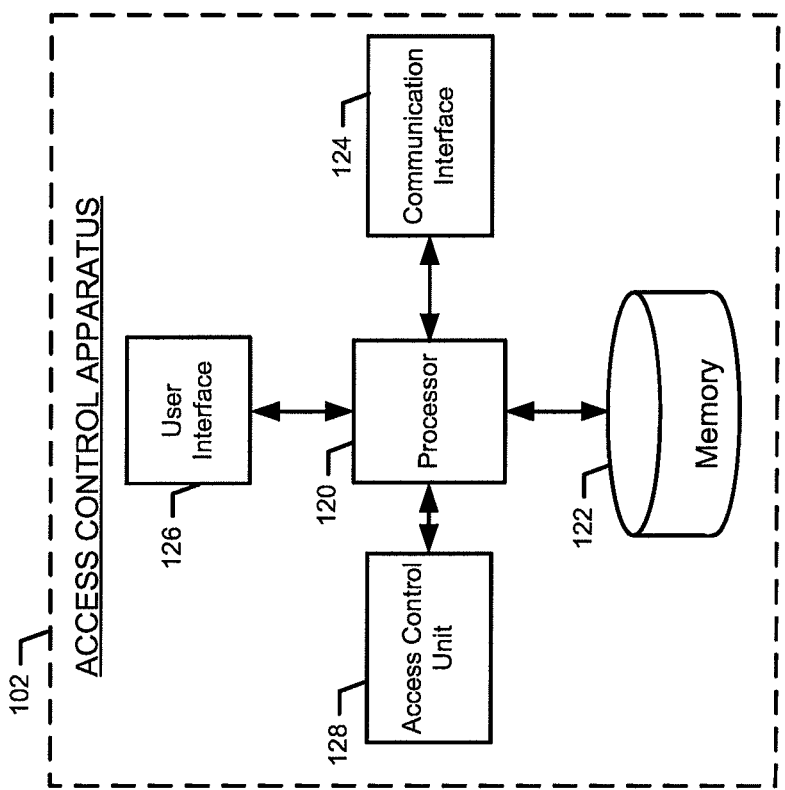
FIG. 1 illustrates an apparatus for controlling access to a resource according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates an access control apparatus 102 for controlling access to a resource according to an example embodiment of the present invention. It will be appreciated that the access control apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an access control apparatus for controlling access to a resource, numerous other configurations may also be used to implement embodiments of the present invention.

The access control apparatus 102 may be embodied as a server, desktop computer, laptop computer, mobile terminal, mobile computer, mobile phone, mobile communication device, audio/video player, television device, network node, multiple computing devices in communication with each other, any combination thereof, and/or the like. In an example embodiment the access control apparatus 102 includes various means for performing the various functions described herein. These means may include, for example, one or more of a processor 120, memory 122, communication interface 124, user interface 126, or access control unit 128 for performing the various functions herein described. The means of the access control apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 120 comprises a plurality of processors. The plurality of processors may be embodied on a single computing device or may be distributed across a plurality of computing devices collectively configured to function as the access control apparatus 102. The plurality of processors may be in operative communication with each other and may be collectively configured to perform one or more functionalities of the access control apparatus 102 as described herein. In an example embodiment, the processor 120 is configured to execute instructions stored in the memory 122 or otherwise accessible to the processor 120. These instructions, when executed by the processor 120, may cause the access control apparatus 102 to perform one or more of the functionalities of the access control apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may include, for example, volatile and/or non-volatile memory. Although illustrated in FIG. 1 as a single memory, the memory 122 may comprise a plurality of memories. The plurality of memories may be embodied on a single computing device or distributed across a plurality of computing devices. The memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the access control apparatus 102 to carry out various functions in accordance with example embodiments of the present invention. For example, in some example embodiments, the memory 122 is configured to buffer input data for processing by the processor 120. Additionally or alternatively, in some example embodiments, the memory 122 is configured to store program instructions for execution by the processor 120. The memory 122 may store information in the form of static and/or dynamic information. This stored information may be stored and/or used by the access control unit 128 during the course of performing its functionalities.

The communication interface 124 may be embodied as any device or means embodied in circuitry, hardware, a computer program product comprising computer readable program instructions stored on a computer readable medium (e.g., the memory 122) and executed by a processing device (e.g., the processor 120), or a combination thereof that is configured to receive and/or transmit data from/to another device, such as, for example, a server, a user terminal (e.g., a user terminal 206 illustrated in FIG. 2), a data source (e.g., the data source 306 illustrated in FIG. 3), and/or the like. In some example embodiments, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with another computing device. The communication interface 124 may be configured to receive and/or transmit data using any protocol that may be used for communications between computing devices. The communication interface 124 may additionally be in communication with the memory 122, user interface 126, and/or access control unit 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the access control apparatus 102 is embodied as a server, aspects of the user interface 126 may be reduced or the user interface 126 may even be eliminated. In another example embodiment wherein the access control apparatus 102 is embodied as a server, at least some aspects of the user interface 126 may be embodied on an apparatus used by an end user that is in communication with the access control apparatus 102, such as for example, a user terminal 206 illustrated in FIG. 2. The user interface 126 may, for example, provide means for a user to initiate a request for access to a resource. The user interface 126 may be in communication with the memory 122, communication interface 124, and/or access control unit 128, such as via a bus.

The access control unit 128 may be embodied as various means, such as circuitry, hardware, a computer program product comprising computer readable program instructions stored on a computer readable medium (e.g., the memory 122) and executed by a processing device (e.g., the processor 120), or some combination thereof and, in some example embodiments, is embodied as or otherwise controlled by the processor 120. In embodiments wherein the access control unit 128 is embodied separately from the processor 120, the access control unit 128 may be in communication with the processor 120. The access control unit 128 may further be in communication with one or more of the memory 122, communication interface 124, or user interface 126, such as via a bus.

Figure 2:
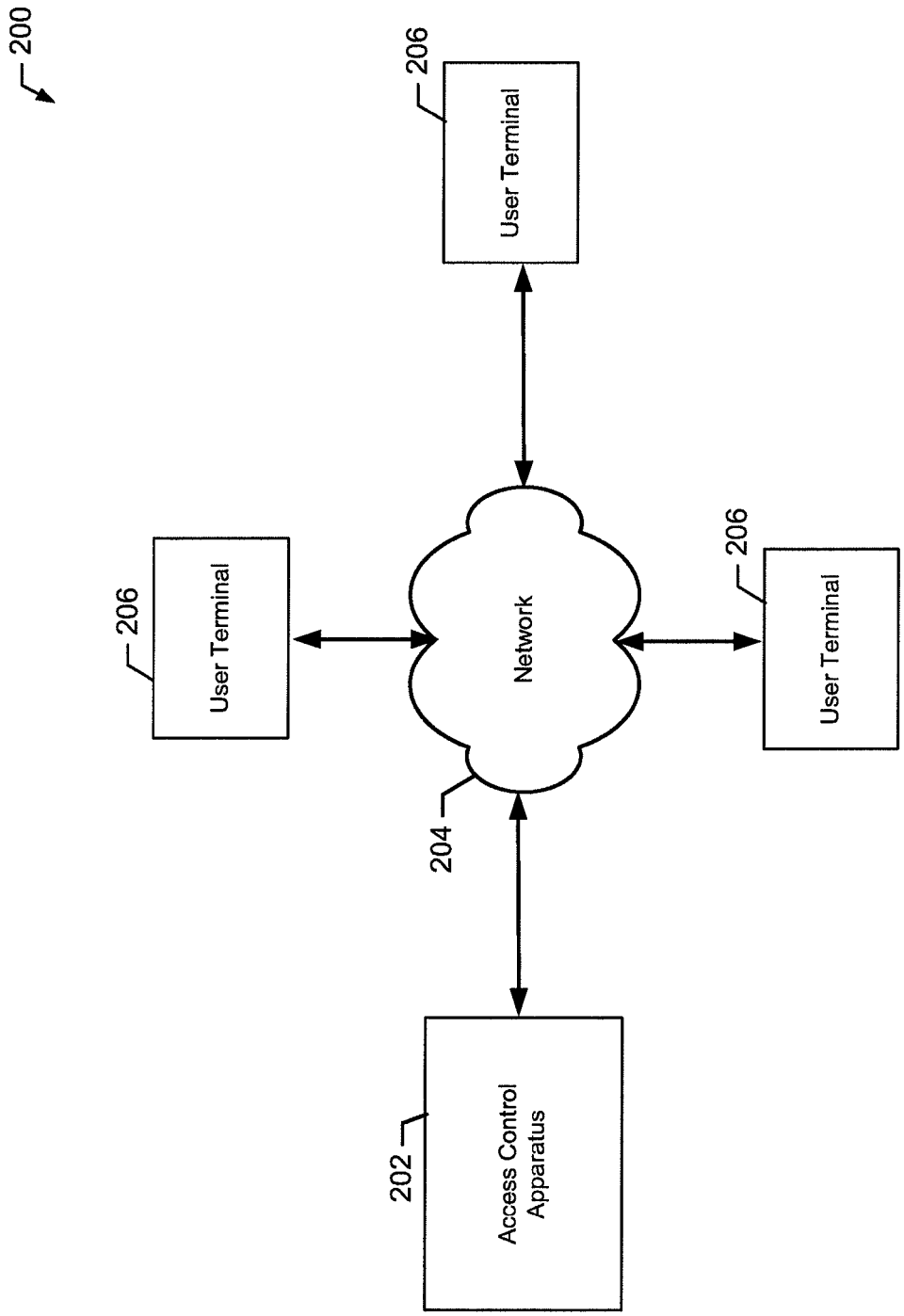
FIG. 2 illustrates a system for controlling access to a resource according to an example embodiment of the present invention.

FIG. 2 illustrates a system 200 for controlling access to a resource according to an example embodiment of the present invention. The system 200 of this embodiment comprises an access control apparatus 202 and one or more user terminals 206 configured to communicate over a network 204. The access control apparatus 202 may, for example, comprise an embodiment of the access control apparatus 102 wherein the access control apparatus 102 is embodied as one or more servers, one or more network nodes, or the like that is configured to control access to a resource in response to a request for access to the resource initiated by a remote user terminal or user thereof. The network 204 may comprise a wireless network (e.g., a cellular network, wireless local area network, wireless personal area network, wireless metropolitan area network, and/or the like), a wireline network, or some combination thereof, and in some embodiments comprises the interne. A user terminal 206 may comprise any device configured for use by a user to access a resource, such as may be stored on the access control apparatus 202, over the network 204. In this regard, a user terminal 206 may be embodied as a desktop computer, laptop computer, mobile terminal, mobile computer, mobile phone, mobile communication device, audio/video player, television device, any combination thereof, and/or the like.

In the example system illustrated in FIG. 2, at least some aspects of the user interface 126 may be embodied on the user terminal 206. For example, the access control apparatus 202 may be configured to provide a network service, such as a web service, for accessing resources stored on or otherwise accessible via the access control apparatus 202 to one or more user terminals 206. A user of the user terminal 206 may accordingly initiate a request for access to a resource and the access control apparatus 202 may be configured to determine whether to grant the request in accordance with one or more of the example embodiments disclosed herein. Accordingly, where a request for access to a resource is described herein, it will be appreciated that the request may be a locally initiated request (e.g., by a user of an access control apparatus) or may be a remotely initiated request (e.g., by a user of a user terminal 206 in communication with an access control apparatus).

Figure 3:
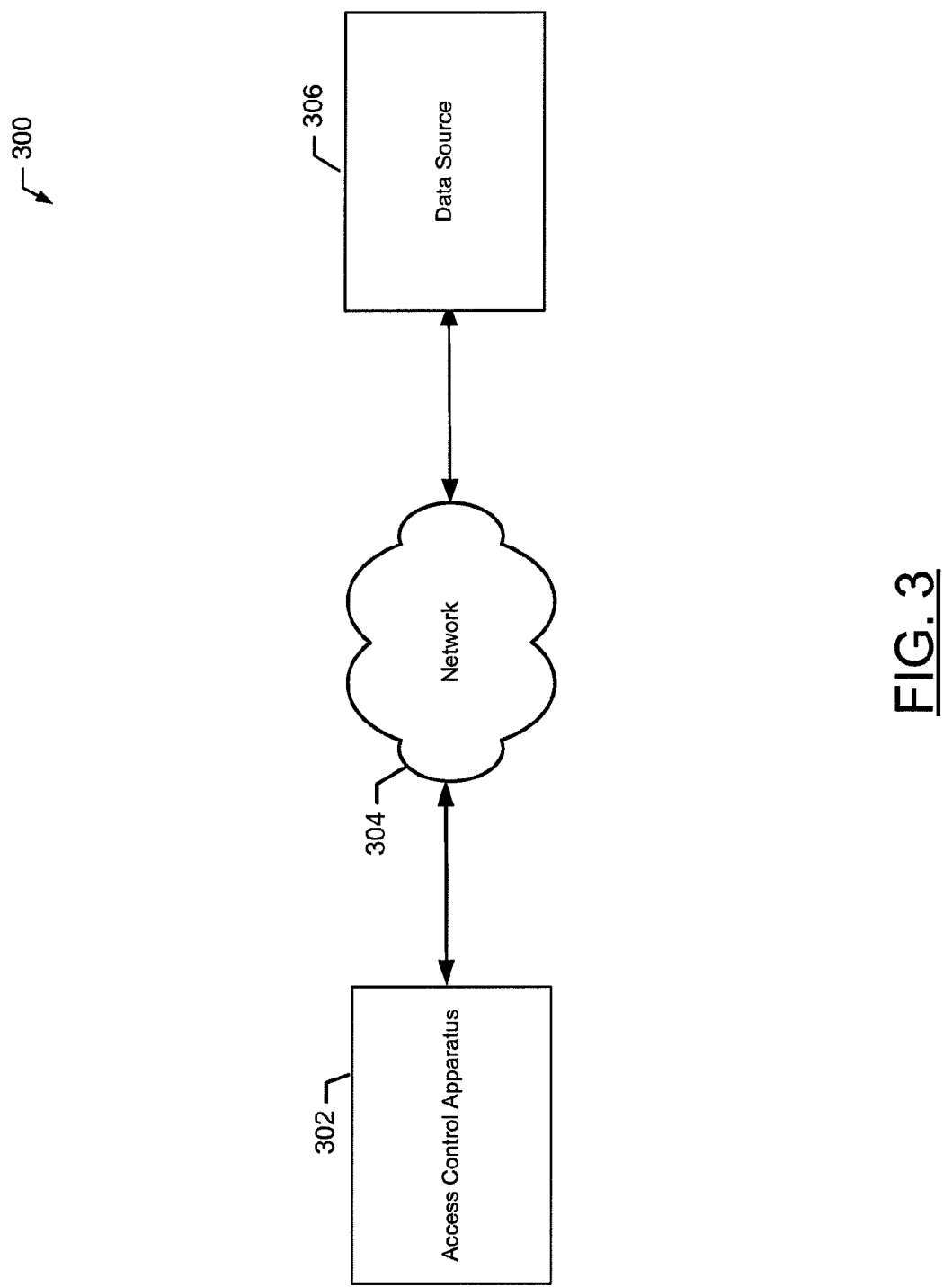
FIG. 3 illustrates a system for controlling access to a resource according to an example embodiment of the present invention.

FIG. 3 illustrates a system 300 for controlling access to a resource according to an example embodiment of the present invention. The system 300 of this embodiment comprises an access control apparatus 302 and one or more data sources 306 configured to communicate over a network 304. The access control apparatus 302 may, for example, comprise an embodiment of the access control apparatus 102. The network 304 may comprise a wireless network (e.g., a cellular network, wireless local area network, wireless personal area network, wireless metropolitan area network, and/or the like), a wireline network, or some combination thereof, and in some embodiments comprises the interne. In some embodiments, the network 304 may comprise the network 204. In this regard, although not illustrated in FIG. 3, the system 300 may further comprise one or more user terminals 206 as illustrated and described in connection with the system 200 of FIG. 2.

A data source 306 may comprise any computing device comprising a memory configured to store one or more resources such that the one or more resources are accessible over the network 304. In this regard, a data source 306 may comprise, for example, a network attached storage device, a server, a desktop computer, laptop computer, mobile terminal, mobile computer, mobile phone, mobile communication device, audio/video player, any combination thereof, and/or the like. It will therefore be appreciated that when the access control unit 128 is described herein to determine whether to grant a request for access to a resource, the resource may be a locally stored resource (e.g., a resource stored on an access control apparatus) or a remotely stored resource (e.g., a resource stored on a data source 306).

A resource may, for example, comprise any file, folder, executable, program, hardware resource, and/or the like. In some embodiments, a resource may be contained in a collection of resources. A collection may similarly be contained within another collection. In this regard, a resource may be contained within a hierarchy of one or more collections. For example, consider a resource: resource.jpg. The resource may be identified by a unique identifier, such as a uniform resource identifier (URI). In an example embodiment, the unique identifier for the resource may comprise the file path name used to access the resource. For example, the file path name may comprise: \folder_A\folder_B\resource.jpg. In such an embodiment, the resource may be contained within the collection folder_B and the collection folder_B may be contained within the collection folder_A. As another example, a unique resource identifier may comprise an interne protocol address, uniform resource locator, or the like which may be used to access a resource.

The access control unit 128 may be configured to use an access control model to facilitate controlling access to a resource. In this regard, an access control model may comprise one or more access control lists (ACLs) that may define access abilities for one or more resources to which access is controlled by the access control unit 128 based on the access control model.

An ACL may be associated with a resource or with a collection of resources and may comprise one or more access control attributes. An access control attribute contained in an ACL may correspond with a respective ability (or a plurality of abilities). An ability may define an access right or privilege with respect to a resource or collection of resources associated with an ACL. In this regard, an ability may comprise any action that may be performed on or using a resource. Example abilities include NONE, READ, WRITE, EXECUTE, ADMINISTER, CHANGE, DELETE, READ_WRITE, READ_DELETE, READ_WRITE_EXECUTE, READ_WRITE_DELETE, some combination thereof, or the like. An all-inclusive ability may comprise a combination of all possible abilities, for example, FULL_ACCESS, or the like. An ability may also comprise a negative ability indicating that a particular access ability for the resource is not allowed. For example, a negative ability may comprise NO_READ, NO_WRITE, NO_EXECUTE, NO_MODIFY, some combination thereof, or the like. An all-inclusive negative ability may comprise a combination of all negative abilities, for example, NO_ACCESS, or the like. An ability may have a unique value, such as may be specified using a hexadecimal value, octal value, or the like. Embodiments wherein abilities have unique values may facilitate accumulation of abilities into a permission mask, as will be described further below with respect to some example embodiments. For example, READ may have the value 0x02 and DELETE may have the value 0x10. Accordingly, READ_DELETE may have the value 0x12, representing the accumulation of the values of READ and DELETE, such as may be performed using a logical OR operation to combine the values of READ and DELETE.

Access control attributes may be grouped into attribute types. For example, an attribute type may comprise ROLE, GROUP, AGE, LOCATION, USER IDENTITY, SECURITY LEVEL, or the like. Example access control attributes for the attribute type ROLE may, for example, comprise MGR, ADMIN, USER, or the like. An access control attribute can also be defined as a value (e.g., 1), a range of values (e.g., 1-3), a list of values (e.g., 2, 3, 5), a list of names (e.g., MGR, ADMIN), or the like. Accordingly, an ACL may define access abilities associated with different access control attributes of a particular attribute type. In this regard, a first access control attribute of an attribute type may be associated with a different ability than a second access control attribute of the attribute type.

An ACL may comprise a plurality of access control attributes. The plurality of access control attributes may fall into a plurality of attribute types. The access control attributes contained in an ACL may be grouped by attribute type and may be set forth in any format that is interpretable by the access control unit 128 such that the access control unit 128 may determine the access control attributes included in an ACL. In some embodiments, an access control attribute may be specified in an ACL with a Boolean modifier or other operation. For example, given the access control attribute MGR of the attribute type ROLE, an ACL may include !MGR such that an ability may be associated with every role other than MGR.

Access control lists may be structured within an access control model in one or more hierarchical arrangements of linked access control lists. In this regard, a hierarchy of linked access control lists may be associated with a hierarchy of one or more collections containing a resource. For example, a hierarchy of linked ACLs may comprise an ACL associated with a resource, an ACL associated with a first collection containing the resource, and an ACL associated with a second collection containing the first collection. Each ACL in the hierarchy of linked ACLs may comprise one or more access control attributes. In this regard, a resource may inherit the access control attributes of a containing collection. In order to facilitate iterative traversal of a hierarchy of linked ACLS by the access control unit 128 when determining whether to grant a request for access to a resource, as will be further described herein below, an ACL may include a link to a higher ACL in the hierarchy. In this regard, an ACL associated with a resource contained in a collection may include a link to an ACL associated with the collection. If the collection is contained in a second collection, the ACL associated with the collection may include a link to an ACL associated with a second collection, and so on until an ACL associated with a root collection in the hierarchy of collections is reached. A link to a higher ACL may comprise a reference to a URI of the ACL, a reference to a location in memory of the ACL, or the like. A hierarchy of ACLs may be contained in a hierarchical data structure, such as a linked list, tree, or the like. Such a hierarchical data structure may further facilitate iterative traversal of the hierarchy.

Figure 4:
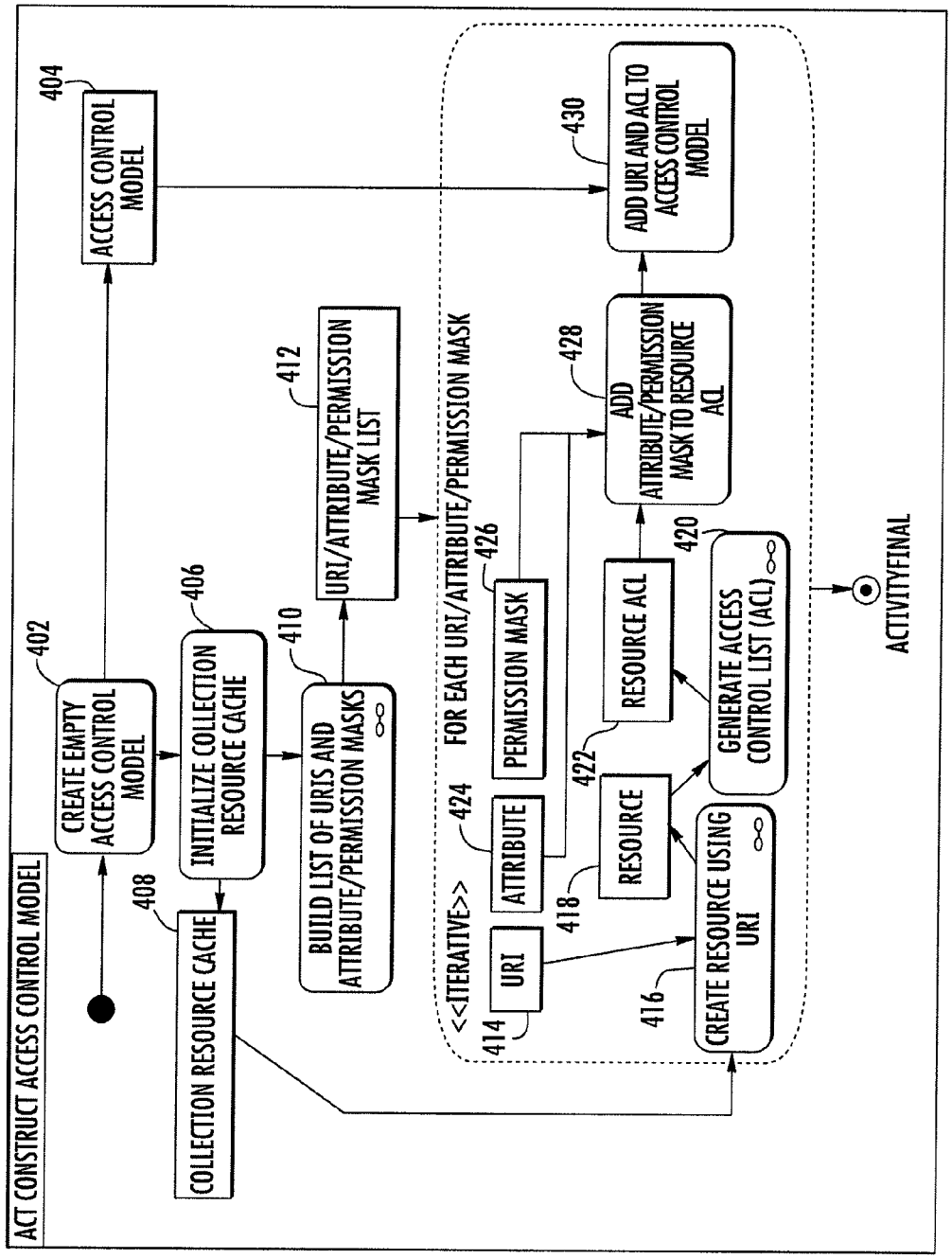
FIG. 4 illustrates a flowchart according to an example method for constructing an access model according to an example embodiment of the invention.

Having now described the structure of an access control model in accordance with some example embodiments, construction of an access control model will now be described. In this regard, FIG. 4 illustrates a flowchart according to an example method for constructing an access control model according to an example embodiment of the invention. The operations illustrated in and described with respect to FIG. 4 may, for example, be performed by, with the assistance of, and/or under the control of one or more of the processor 120, memory 122, communication interface 124, user interface 126, or access control unit 128. Operation 402 may comprise creating an empty access control model 404. In this regard, the access control model 404 could be considered the resultant of the collective operations in FIG. 4 which may serve to populate the empty access control model 404 created in operation 402. Operation 406 may comprise initializing a collection resource cache 408. The collection resource cache 408 may comprise a container used to store collection resources (e.g., resources that are also collections) encountered during the construction of an access control model to facilitate quick lookup of a collection resource. Operation 410 may comprise building a URI/attribute/permission mask list 412 where each entry in the list consists of a URI that references a resource to be placed under access control, an attribute, and a permission mask which may specify one or more abilities. The list 412 built in operation 410 may be used for iterative construction of an ACL for each URI in the list.

Operation 416 may comprise creating a resource 418 using a URI 414 from the list 412. Operation 420 may comprise generating an ACL 422 associated with the resource 418. Each attribute 424 and associated permission mask (or other indication of one or more abilities associated with a respective attribute) 426 may be added to the ACL, at operation 428. The ACL and an indication of the associated URI (e.g., the associated resource) may be added to the access control model, at operation 430. Operations 416-430 may be iteratively repeated for each URI/attribute/permission mask entry in list 412.

Figure 5:
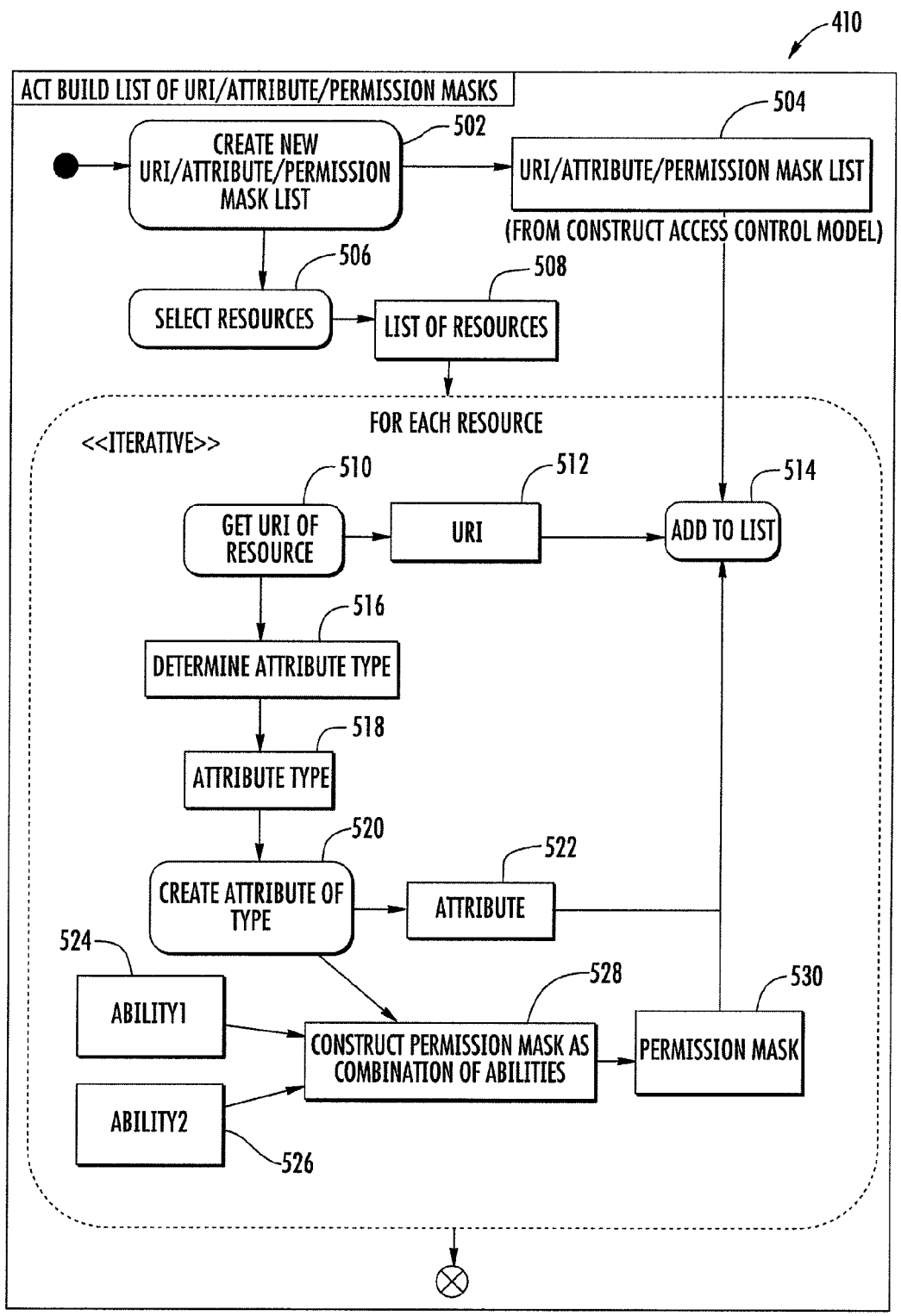
FIG. 5 illustrates a flowchart according to an example method for building a list of resource identifiers and attributes for use in an access control model according to an example embodiment of the invention.

Referring now to FIG. 5, FIG. 5 illustrates a flowchart according to an example method for building a list of resource identifiers, attributes, and permission masks for use in an access control model according to an example embodiment of the invention. In this regard, FIG. 5 illustrates operations that may collectively comprise operation 410 as illustrated in FIG. 4. The operations illustrated in and described with respect to FIG. 5 may, for example, be performed by, with the assistance of, and/or under the control of one or more of the processor 120, memory 122, communication interface 124, user interface 126, or access control unit 128.

Operation 502 may comprise creating a new URI/attribute/permission mask list 504. The list may initially be empty, but may be filled with a list of URIs and for each URI, associated access control attributes and the abilities (e.g., permission masks) associated with the access control attributes by way of the other operations illustrated in FIG. 5. In this regard, the URI/attribute/permission mask list 504 may be considered the resultant of the collective operations in FIG. 5. Operation 506 may comprise selecting a list of resources 508 to be included in the access control model.

Operations 510-530 will now be described in the context of a single resource. However, it will be appreciated that operations 510-530 may be repeated for each resource included in the list of resources 508. Operation 510 may comprise getting the URI 512 of the resource. Operation 514 may comprise adding the URI of the resource to the list of URIs/attributes/permission masks. Operation 516 may comprise determining the attribute type 518 of the attribute 522 to be associated with the resource. Operation 520 may comprise creating an attribute 522 of the attribute type 518, which are to be associated with the resource. The created attribute 522 may be added to the URI/attribute/permission mask list in association with the URI of the resource, at operation 514. Operation 528 may comprise constructing a permission mask 530 for the created attribute 522. The permission mask 530 may comprise a combination of the one or more abilities associated with the attribute (e.g., the ability1 524 and ability2 526). A constructed permission mask may be added to the URI/attribute/permission mask list 504 in association with its associated attribute, at operation 514. Operations 516-530 may be repeated for the purpose of associating additional attributes and permission masks to the resource.

Figure 6:
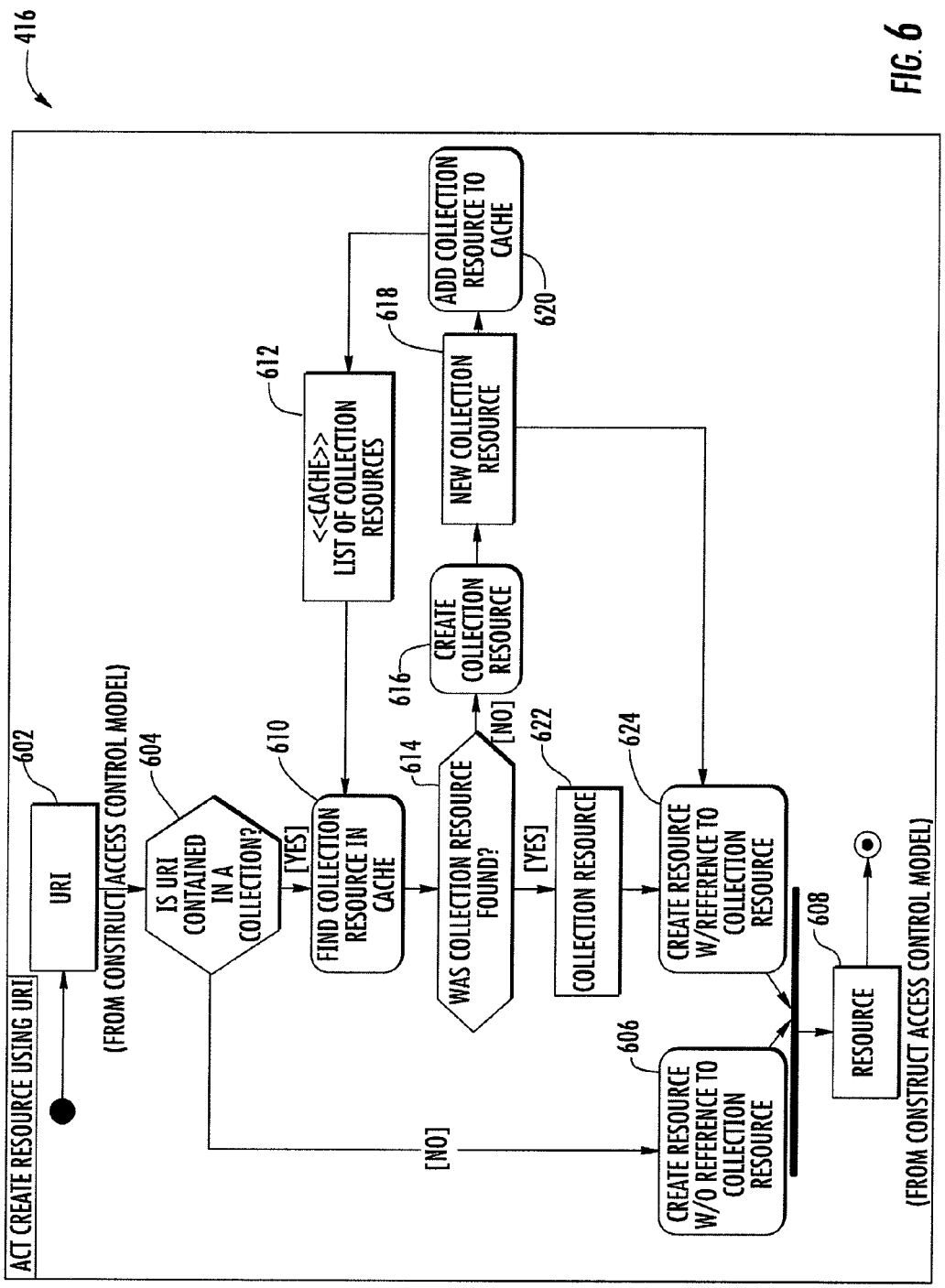
FIG. 6 illustrates a flowchart according to an example method for creating a resource according to an example embodiment of the invention.

Referring now to FIG. 6, FIG. 6 illustrates a flowchart according to an example method for creating a resource according to an example embodiment of the invention. In this regard, FIG. 6 illustrates operations that may collectively comprise operation 416 as illustrated in FIG. 4. The operations illustrated in and described with respect to FIG. 6 may, for example, be performed by, with the assistance of, and/or under the control of one or more of the processor 120, memory 122, communication interface 124, user interface 126, or access control unit 128.

Operation 602 may comprise accessing a URI of a resource. Operation 604 may comprise determining whether the URI is contained in a collection. If the URI is not contained in a collection, the method may proceed to operation 606, where resource 608 may be created without reference to a collection resource. In this regard, resource 608 may be considered the resultant of the collective operations in FIG. 6.

If, however, the URI is contained in a collection, the method may proceed to operation 610 where an attempt may be made to find the collection resource in a cached list of collection resources 612. Operation 614 may accordingly comprise determining whether the collection resource was found in the cache 612. If the collection resource was not found, a collection resource 618 may be created, at operation 616. The created collection resource 618 may be added to the cache 612, at operation 620. The method may return to operation 610. In an instance in which a collection resource is found in the cached list of collection resources 612, operation 622 may comprise retrieving the collection resource from the cache 612. Operation 624 may comprise creating the resource with a reference to the collection resource (e.g., the collection resource retrieved in operation 622 or created in operation 616) and the created resource may be output, at operation 608.

Figure 7:
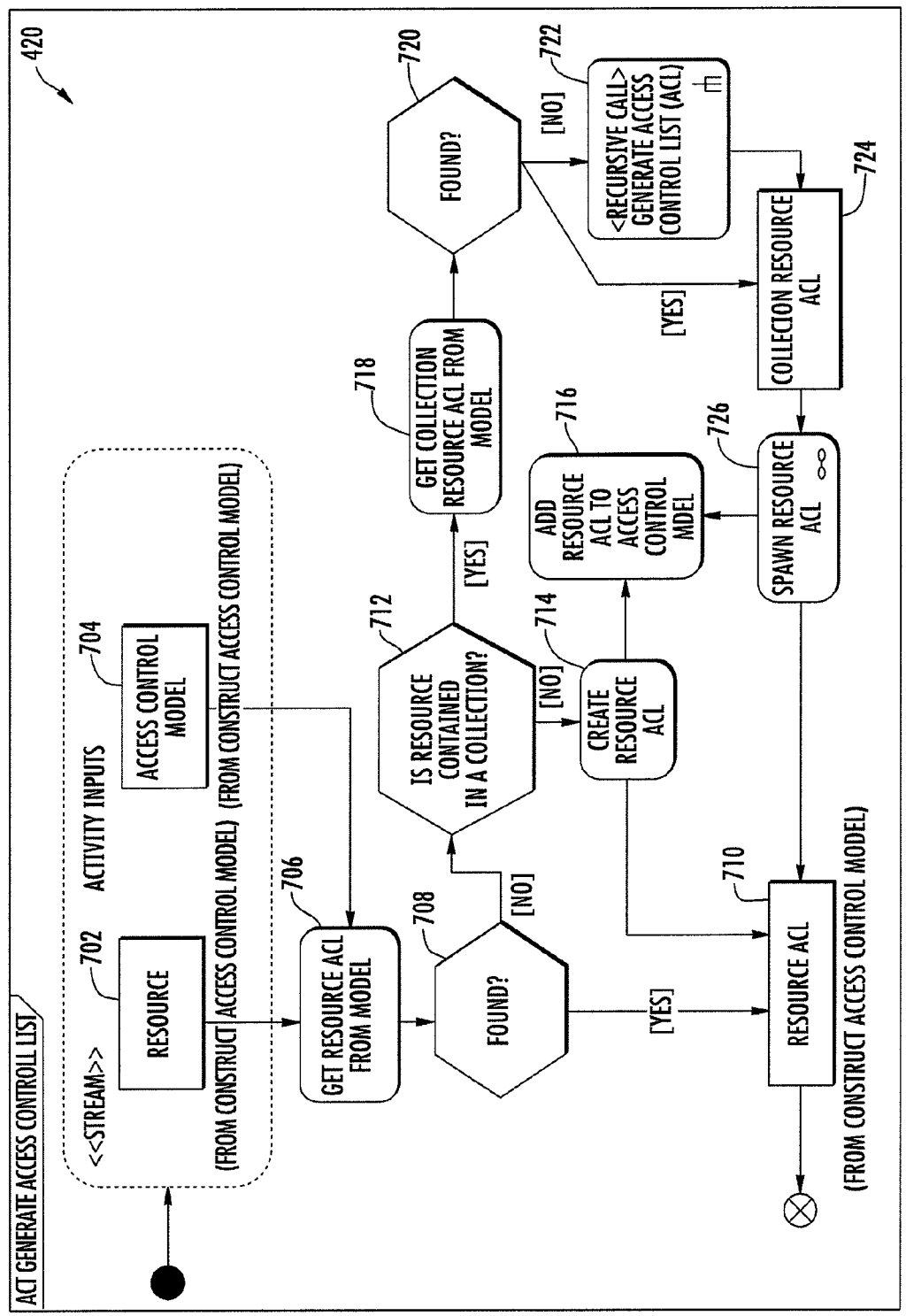
FIG. 7 illustrates a flowchart according to an example method for generating an access control list according to an example embodiment of the invention.

Referring now to FIG. 7, FIG. 7 illustrates a flowchart according to an example method for generating an access control list according to an example embodiment of the invention. In this regard, FIG. 7 illustrates operations that may collectively comprise operation 420 as illustrated in FIG. 4. The operations illustrated in and described with respect to FIG. 7 may, for example, be performed by, with the assistance of, and/or under the control of one or more of the processor 120, memory 122, communication interface 124, user interface 126, or access control unit 128.

Operations 702 and 704 may comprise accessing a resource and access control model, respectively. Operation 706 may comprise attempting to obtain the ACL associated with the resource from the access control model. Operation 708 may comprise determining whether the resource ACL 710 associated with the resource was found in the access control model (e.g., based on the results of operation 706). In this regard, resource ACL 710 may be considered the resultant of the collective operations in FIG. 7.

In an instance in which the ACL associated with the resource is not found, the method may proceed to operation 712, wherein it may be determined whether the resource is contained in a collection. In an instance in which it is determined that the resource is not contained in a collection, the method may proceed to operation 714, where an resource ACL 710 associated with the resource may be created. Operation 716 may comprise adding the created ACL to the access control model In an instance in which it is determined at operation 712 that the resource is contained in a collection, operation 718 may comprise accessing the ACL associated with the collection from the access control model. Operation 720 may comprise determining whether the ACL associated with the collection was found in operation 718. In an instance in which the ACL associated with the collection is not found, the method may proceed to operation 722 wherein the method illustrated in FIG. 7 may be recursively performed with the resource accessed in operation 702 being the collection. In an instance in which the ACL associated with the collection is found, the method may proceed to operation 724 wherein the ACL associated with the collection is retrieved and used to spawn resource ACL 710 associated with the resource, at operation 726. Operation 716 may comprise adding the spawned resource ACL 710 to the access control model.

Figure 8:
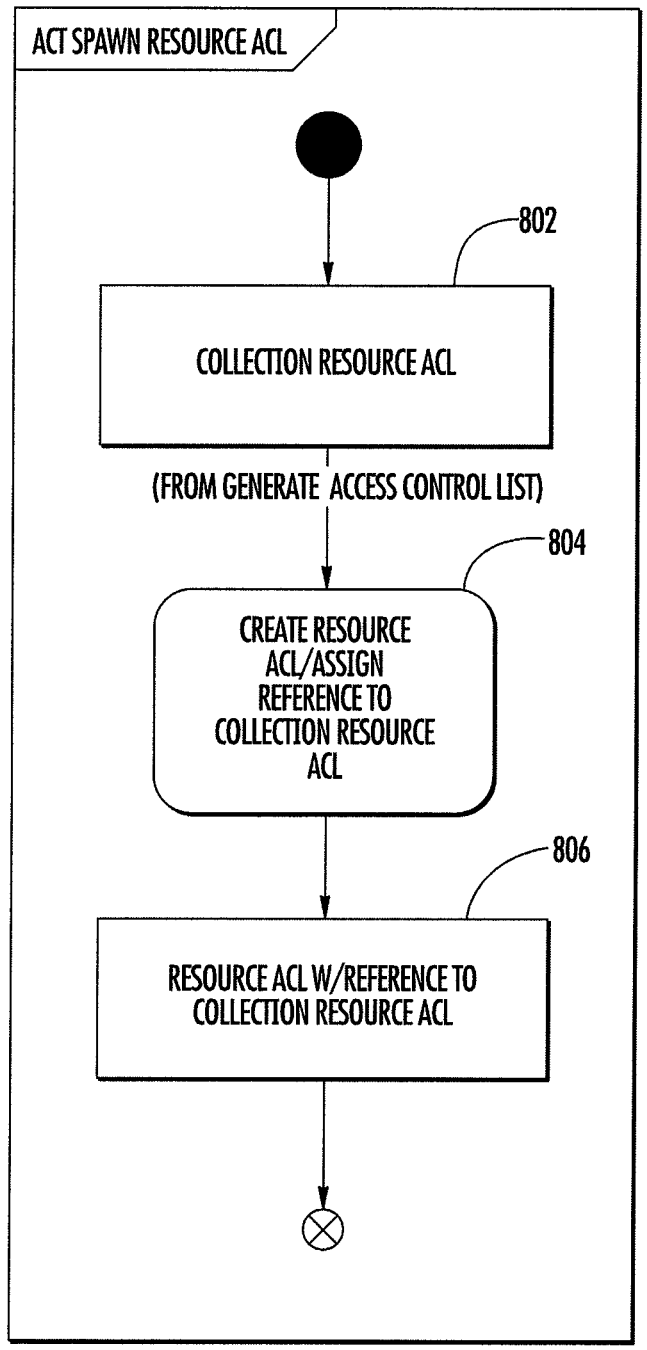
FIG. 8 illustrates a flowchart according to an example method for spawning an access control list associated with a resource from an access control list associated with a collection containing the resource according to an example embodiment of the invention.

Referring now to FIG. 8, FIG. 8 illustrates a flowchart according to an example method for spawning an access control list associated with a resource from an access control list associated with a collection containing the resource according to an example embodiment of the invention. In this regard, FIG. 8 illustrates operations that may collectively comprise operation 726 as illustrated in FIG. 7. The operations illustrated in and described with respect to FIG. 8 may, for example, be performed by, with the assistance of, and/or under the control of one or more of the processor 120, memory 122, communication interface 124, user interface 126, or access control unit 128. Operation 802 may comprise accessing the ACL associated with the collection resource. Operation 804 may comprise creating a resource ACL 806 associated with the resource. In this regard resource ACL 806 may be considered the resultant of the collective operations in FIG. 8. Operation 804 may further comprise including a link or other reference to the ACL associated with the collection resource in the created resource ACL 806. In this regard, the link may indicate the hierarchy of ACLs corresponding to the collection hierarchy and may facilitate iterative traversal of the linked hierarchy of ACLs when determining whether to grant a request for access a resource.

The access control unit 128 may be configured in some example embodiments to load and cache a copy of an access control model, such as in a cache section of the memory 122 or in other cache memory accessible to the access control unit 128. In this regard, when determining whether to grant a request for access to a resource, the access control unit 128 may access ACLs contained in the cached copy of the access control model without making repeated database queries, which may be both processing intensive and time inefficient. Accordingly, example embodiments wherein a copy of the access control model is cached for use in determining whether to grant a request for access to a resource may facilitate more efficient determination of whether to grant the request.

In example embodiments wherein a copy of the access control model is cached, the access control unit 128 may be configured to refresh the cached copy of the access control model. In this regard, the original access control model may be updated, such as when new resources, users, and/or the like are added to or removed from a secured system. Accordingly, a cached copy of the access control model may be out of date after the access control model has been updated. The access control unit 128 may be configured to refresh the cached copy in accordance with any appropriate refresh policy. The access control unit 128 may, for example, be configured to refresh the cached copy periodically (e.g., once every hour, once a day, once a week, or the like). As another example, the access control unit 128 may be configured to refresh a cached copy in response to updating of the access control model. It will be appreciated that the refresh policy may be tailored for a secured system on which an embodiment of the invention is implemented. In this regard, some secured systems may be more frequently updated with new resources, users, or the like while other secured systems may be more static. It may be advantageous to refresh a cached copy of the access control model more frequently in a secured system that is updated more frequently.

The access control unit 128 may be configured to receive a request for access to a resource. The request may, for example, be initiated by a user, by a computing device, or the like. The request may be associated with one or more request attributes. The request attributes may describe characteristics of a user initiating the request, characteristics of a computing device initiating the request, characteristics of a purpose of the request, and/or the like. For purposes of describing some example embodiments, user attributes will be discussed further below. However, it will be appreciated that wherever user attributes are discussed, other types of request attributes may be substituted for user attributes or considered in addition to user attributes. The request may be further associated with one or more abilities. In this regard, a request may require one or more abilities. For example, if the request is to open and edit a file, the request may require both READ and WRITE abilities.

The resource for which access is requested may be indicated by a unique identifier of the resource, such as a URI. The access control unit 128 may be configured to use the identifier to access an ACL associated with the resource from the access control model (e.g., from a cached copy of the access control model). The access control unit 128 may be further configured to determine a permission defining one or more access abilities for the resource at least in part by comparing the request attributes to the access control attribute(s) contained in the ACL. In this regard, the access control unit 128 may be configured to determine whether an access control attribute in the ACL corresponds to a request attribute. This determination may, for example, be performed with respect to each request attribute. If an access control attribute is found that corresponds to a request attribute, the access control unit 128 may include the ability (or abilities) associated with the access control attribute in the permission. In this regard, the permission may comprise an accumulation of one or more abilities corresponding to the request attributes associated with the request. If a negative ability is accumulated in the permission, then a corresponding positive attribute included in the permission may be removed from the permission. Thus, for example, if a permission includes READ ability and a NO_READ ability is accumulated in the permission, then the READ ability may be removed from the permission, as the requestor is not entitled to have READ ability due to negation by the NO_READ ability. Accordingly, the permission may define the access abilities that the requestor is entitled to and may be used to determine whether to grant the request.

In some example embodiments, the permission is defined as a permission mask. In such embodiments, the access control unit 128 may initialize an initial empty permission (e.g., 0x00) in response to receipt of a request for access to a resource. As previously discussed, an ability may have a unique value. Accordingly, an ability found to correspond to a request attribute may be accumulated in the permission by performing a logical OR operation on a current value of the permission and the ability such that the ability is accumulated in the permission. Thus, for example, if a user is found to have READ ability (e.g., 0x02) and WRITE ability (e.g., 0x04) for a resource based on a comparison of the request attributes to the access control attributes in the ACL, the determined permission mask may have the value 0x06 (e.g., 0x00 OR 0x02 OR 0x04=0x06).

In some embodiments wherein the permission is defined as a permission mask, the access control unit 128 may be configured to determine the permission mask by combining two or more intermediate permission masks. In this regard, the access control unit 128 may be configured to accumulate positive abilities in a first permission mask (e.g., a positive permission mask) and negative abilities in a second permission mask (e.g., a negate permission mask). The access control unit 128 may be configured to determine the final permission mask by performing a logical AND operation on the first permission mask and the second permission mask such that any negative abilities accumulated in the negative permission mask may cancel out corresponding positive abilities in the positive permission mask. As an example, assume a user is found to have READ ability (e.g., 0x02), WRITE ability (e.g., 0x04), and NO_WRITE ability (e.g., −0x04) for a resource. The resulting positive permission mask may have the value 0x06 (e.g., 0x00 OR 0x02 OR 0x04=0x06) and the resulting negate permission mask may have the value −0x04 (e.g., 0x00 OR −0x04). Accordingly, the resulting permission mask may have the value 0x02 (e.g. 0x06 AND −0x04), indicating the user has only READ ability, as the WRITE ability and NO_WRITE abilities canceled out.

In an instance in which the an access control attribute corresponding to a request attribute is not found in the ACL associated with the requested resource, the access control unit 128 may be configured to determine whether the resource is contained in a collection. For example, the access control unit 128 may be configured to determine whether the ACL includes a link to a hierarchically higher order ACL associated with a collection containing the resource. If so, the access control unit 128 may access the ACL associated with the collection and determine whether the ACL associated with the collection includes an access control attribute corresponding to the request attribute. If the ACL associated with the collection does include an access control attribute corresponding to the request attribute, the access control unit 128 may include the ability associated with the corresponding access control attribute in the permission as previously described. If, however, the ACL associated with the collection does not include an access control attribute corresponding to the request attribute, the access control unit 128 may continue to iteratively access the access control lists for collections containing the resource (e.g., by using links contained in the ACLs) until an access control attribute corresponding to the request attribute is found or until an ACL associated with the root collection in the hierarchy of collections containing the resource is accessed. In this way, the access control unit 128 may be configured to determine access control attributes and associated abilities inherited by a resource contained in a hierarchy of one or more collections.

The access control unit 128 may use a determined permission to determine whether to grant a request. In this regard, since the permission may comprise an accumulation of determined abilities, the access control unit 128 may be configured to determine whether an ability required for the request is included within the determined permission. If the required ability is included in the permission, the access control unit 128 may grant the request. If, however, the required ability is not included in the permission, the access control unit 128 may deny the request.

In embodiments wherein the permission comprises a permission mask, the access control unit 128 may be configured to determine whether the permission comprises an ability required for the request by performing a logical AND operation on the permission mask and the value of the ability required for the request. If the result of the AND operation is a non-zero value, then the ability is contained within the request. Thus, for example, if the value of a determined permission mask is 0x12 and the request requires a READ ability having the value 0x02, 0x12 AND 0x02 results in 0x02, indicating that READ ability is included in the permission mask.

As an example, consider a collection of game resources, as described in Table 1 below:

| Resource | Collection | Attribute: Permission |
|---|---|---|
| GAMES website | | ROLE: guest = READ |
| | | ROLE: member = READ |
| | | ROLE: premium-member = READ |
| MEMBERS section | GAMES website | ROLE: guest = NOACCESS |
| | | ACCTSTATUS: overdue = !EXECUTE |
| | | STATE: MS = !READ |
| PREMIUM section | MEMBERS section | ROLE: !premium-member = !READ |
| SLOTS game | MEMBERS section | AGE: >=18 = EXECUTE |
| HUNT'IN game | PREMIUM section | AGE: >14 = EXECUTE |
| | | AGE: <=14 = !READ |
| | | STATE: LA = !EXECUTE |
| HUNT'IN (LA edition) game | PREMIUM section | AGE: >12 = EXECUTE |
| | | STATE: !LA = !EXECUTE |

The resources are listed in the left most column and their respective containing collections are indicated in the center column. In this regard, for example, the SLOTS game may be contained in the collection MEMBERS section, which may be contained in the collection GAMES website. The access control attributes and associated abilities included in ACLs associated with the resources are set forth in the right most column. As described previously, a resource may inherit the access control attributes and associated abilities of its containing collections. Accordingly, the SLOTS game may inherit access control attributes and associated abilities contained in ACLs associated with the MEMBERS section and the GAMES website.

Considering the resources, collection hierarchies, and associated ACL contents as set forth in Table 1, given five example users having various example user attributes, the determined access permissions for the resources may be determined as set forth in Table 2:

| Resource | ROLE | STATE | ACCT-STATUS | AGE | Permission |
|---|---|---|---|---|---|
| User 1 | guest | | | | |
| GAMES | READ | | | | READ |
| MEMBERS | NOACCESS | | | | NOACCESS |
| PREMIUM | NOACCESS | | | | NOACCESS |
| SLOTS | NOACCESS | | | | NOACCESS |
| HUNT'IN | NOACCESS | | | | NOACCESS |
| HUNT'IN (LA) | NOACCESS | | | | NOACCESS |
| User 2 | member | NC | Current | 20 | |
| GAMES | READ | | | | READ |
| MEMBERS | READ | | | | READ |
| PREMIUM | !READ | | | | NOACCESS |
| SLOTS | READ | | | EXECUTE | READ + EXECUTE |
| HUNT'IN | !READ | | | EXECUTE | EXECUTE |
| HUNT'IN (LA) | !READ | !EXECUTE | | EXECUTE | NOACCESS |
| User 3 | member | LA | Overdue | 16 | |
| GAMES | READ | | | | READ |
| MEMBERS | READ | | !EXECUTE | | READ |
| PREMIUM | !READ | | !EXECUTE | | NOACCESS |
| SLOTS | READ | | !EXECUTE | EXECUTE | READ |
| HUNT'IN | !READ | !EXECUTE | !EXECUTE | EXECUTE | NOACCESS |
| HUNT'IN (LA) | !READ | | !EXECUTE | EXECUTE | NOACCESS |
| User4 | premium | MS | Current | 45 | |
| GAMES | READ | | | | READ |
| MEMBERS | READ | !READ | | | NOACCESS |
| PREMIUM | READ | !READ | | | NOACCESS |
| SLOTS | READ | !READ | | EXECUTE | EXECUTE |
| HUNT'IN | READ | !READ | | EXECUTE | EXECUTE |
| HUNT'IN (LA) | READ | !READ | | EXECUTE | EXECUTE |
| User 5 | premium | NC | Current | 15 | |
| GAMES | READ | | | | READ |
| MEMBERS | READ | | | | READ |
| PREMIUM | READ | | | | READ |
| SLOTS | READ | | | !READ | NOACCESS |
| HUNT'IN | READ | | | EXECUTE | READ + EXECUTE |
| HUNT'IN (LA) | READ | !EXECUTE | | EXECUTE | READ |

In this regard, User 1 having the attribute "guest" for the attribute type "ROLE" may have READ ability for the GAMES website, but may not have any access ability for the resources contained in the GAMES website collection. As another example, User 2 may have the attribute "member" for the attribute type "ROLE," the attribute "NC" for the attribute type "STATE," the attribute "current" for the attribute type "ACCTSTATUS," and the attribute "20" for the attribute type "AGE." Given these attributes, User 2 may have READ ability for the GAMES website due to being a "member." User 2 may not have any access ability to the PREMIUM section because User 2's ROLE is a "member" and not a "premium-member." User 2 may have EXECUTE ability for the HUNT'IN game due to having an AGE greater than 14. User 2 may not have any access to the HUNT'IN (LA edition) game. In this regard, while User 2's age is greater than 12 and this attribute is associated with the EXECUTE ability, User 2's state is not LA, which is associated with the ability !EXECUTE, which negates the EXECUTE ability associated with User 2's age attribute.

Considering another example, assume there is a collection of documents that need to be kept secure based on a user's security clearance level, having the attribute type "SECURITYLVL." The URI for the root collection may be defined as \docs. The ACL for the root collection may, for example, be defined as:

| Attribute Type | Attribute | Ability |
|---|---|---|
| SECURITYLVL | 1-5 | READ |

In this regard, a user having a security clearance level between 1-5 may be granted READ ability for a resource contained in the collection \docs, unless the ability is contravened by an ACL associated with a collection or resource contained in the collection \docs. Now, assume the collection \docs includes a collection of secure documents which are only accessible to a user having a security clearance level between 3-5. The URI for this collection may be defined as \docs\secure. The ACL for the \docs\secure collection may, for example, be defined as:

| Attribute Type | Attribute | Ability |
|---|---|---|
| SECURITYLVL | 1-2 | NOACCESS |
| SECURITYLVL | 3-5 | READ |

Now assume a resource payrates.pdf is added to the \docs\secure collection and has the URI \docs\secure\payrates.pdf. A user having the role of Payroll Administrator (PRADMIN) may be granted the ability to READ/WRITE/DELETE payrates.pdf. Accordingly, the ACL for payrates.pdf may be set forth as:

| Attribute Type | Attribute | Ability |
|---|---|---|
| ROLE | PRADMIN | READ/WRITE/DELETE |

Thus, in order to determine if a user requesting READ access to payrates.pdf, a list of the request attributes may be determined. For example, the user may have the attributes ROLE=MGR, SECURITYLVL=3. The access control unit 128 may, for example, perform the following operations to determine whether to grant the request:

Initialize empty permission
Look for attribute type of ROLE and attribute name MGR in the ACL associated with payrates.pdf. (not found)
Look for attribute type of ROLE and attribute name MGR in the ACL associated with the \docs\secure collection. (not found)
Look for attribute type of ROLE and attribute name MGR in the ACL associated with the \docs collection. (not found)
Look for attribute type of SECURITYLVL and attribute name 3 in the ACL associated with payrates.pdf. (not found)
Look for attribute type of SECURITYLVL and attribute name 3 in the ACL associated with the \docs\secure collection.
 Found a SECURITYLVL attribute with attribute name 1-2. Evaluate and find false.
 Found a SECURITYLVL attribute with attribute name 3-5. Evaluate and find true. Permission=permission ORed with READ.
No more attributes in user attribute list. Done.
Permission is READ.
Required READ attribute is contained in permission. Grant Request.

If, in contrast, the requesting user had the attributes ROLE=USER, SECURITYLVL=1, the request would not have been granted based on the respective ACLs above. If, however, the ACL associated with the \docs\secure collection was instead defined as:

| Attribute Type | Attribute | Ability |
|---|---|---|
| SECURITYLVL | 3-5 | READ | the requesting user may have READ permission and the request may be granted. In this regard, the access control unit 128 may, for example, perform the following operations:

Initialize empty permission
Look for attribute type of ROLE and attribute name MGR in the ACL associated with payrates.pdf (not found)
Look for attribute type of ROLE and attribute name MGR in the ACL associated with the \docs\secure collection. (not found)
Look for attribute type of ROLE and attribute name MGR in the ACL associated with the \docs collection. (not found)
Look for attribute type of SECURITYLVL and attribute name 1 in the ACL associated with payrates.pdf (not found)
Look for attribute type of SECURITYLVL and attribute name 1 in the ACL associated with the \docs\secure collection.
 Found a SECURITYLVL attribute with attribute name 3-5. Evaluate and find false.
Look for attribute type of SECURITYLVL and attribute name 1 in the ACL associated with the \docs collection.
 Found a SECURITYLVL attribute with attribute name 1-5. Evaluate and find true. Permission=permission ORed with READ.
No more attributes in user attribute list. Done.
Permission is READ.
Required READ attribute is contained in permission. Grant Request.

Figure 9:
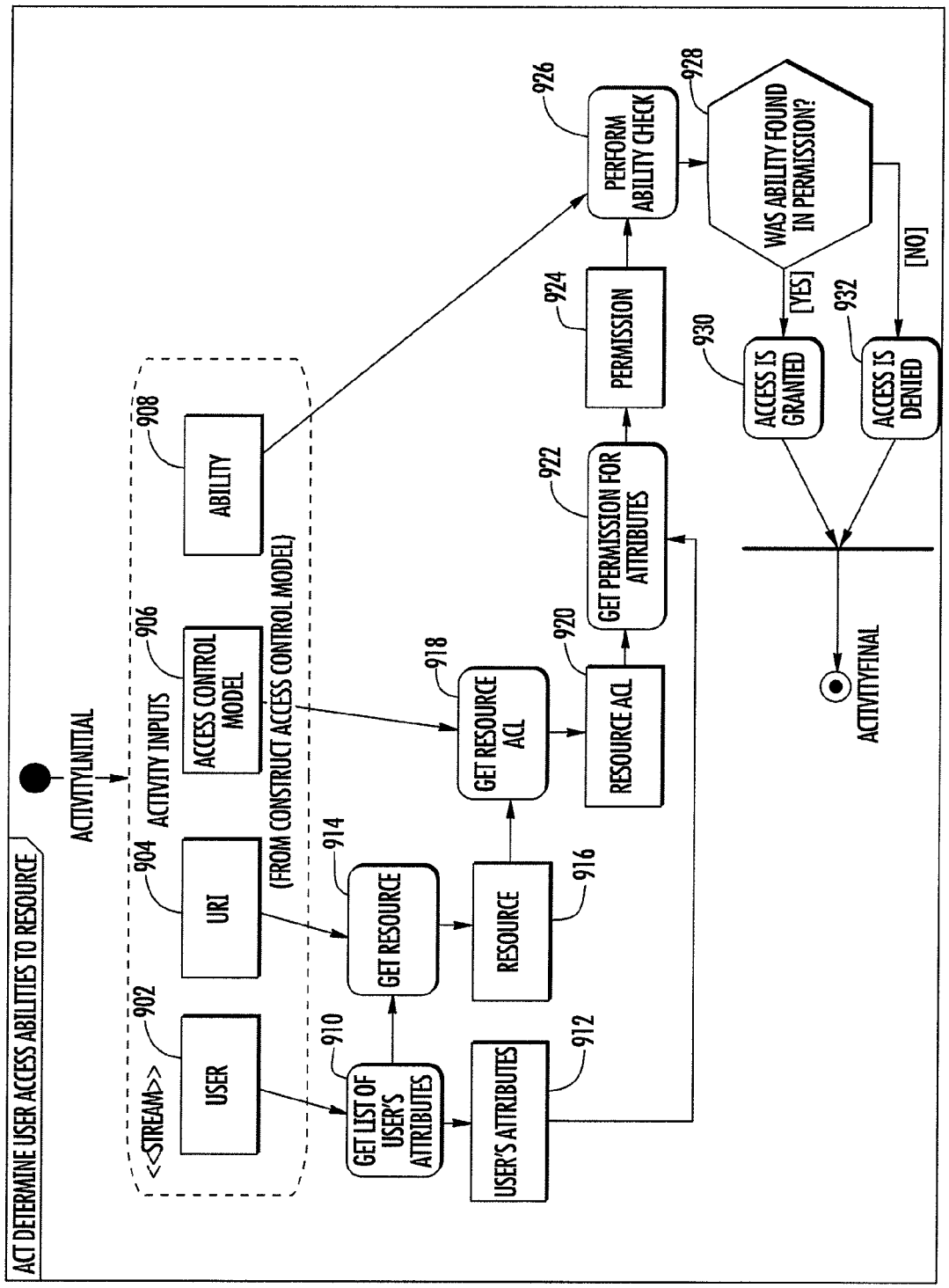
FIG. 9 illustrates a flowchart according to an example method for determining whether to grant a user request for access to a resource according to an example embodiment of the invention.

Having now described control of access to a resource in accordance with some example embodiments, a more detailed description of some example embodiments will now be described in the context of FIGS. 9-10. In this regard, FIG. 9 illustrates a flowchart according to an example method for determining whether to grant a user request for access to a resource according to an example embodiment of the invention. The operations illustrated in and described with respect to FIG. 9 may, for example, be performed by, with the assistance of, and/or under the control of one or more of the processor 120, memory 122, communication interface 124, user interface 126, or access control unit 128.

Referring now to FIG. 9, when determining whether to grant a user request for access to a resource, the access control unit 128 may consider a plurality of inputs. The inputs may, for example, comprise an indication (e.g., an identity) of a requesting user 902, which may be used to derive the user's attributes. It will be appreciated that while the example embodiments described with respect to FIGS. 9-10 discuss user attributes, other types of request attributes may be considered in addition to or in lieu of user attributes. The inputs may additionally comprise an identifier (e.g., a URI) 904 of the requested resource. The inputs may further comprise an access control model 906 for the secured system containing the requested resource. The access control model 906 may comprise a cached copy of the access control model. The inputs may also comprise an ability 908 required for the request.

Operation 910 may comprise determining the user's attributes 912. Operation 914 may comprise using the URI 904 to obtain the requested resource 916. Operation 918 may comprise accessing the ACL 920 associated with the resource from the access control model 906. Operation 922 may comprise determining the permission for the user's attributes 912 at least in part by comparing the user's attributes 912 to the access control attributes in the ACL 920. The permission 924 may be determined as a result of operation 922. Operations 926 and 928 may comprise determining whether the required ability 908 is contained within the permission 924. In an instance in which the required ability 908 is determined to be included within the permission 924, the request for access to the resource may be granted, at operation 930. If, however, the required ability 908 is determined to not be included within the permission 924, the request for access to the resource may be denied, at operation 932.

Figure 10:
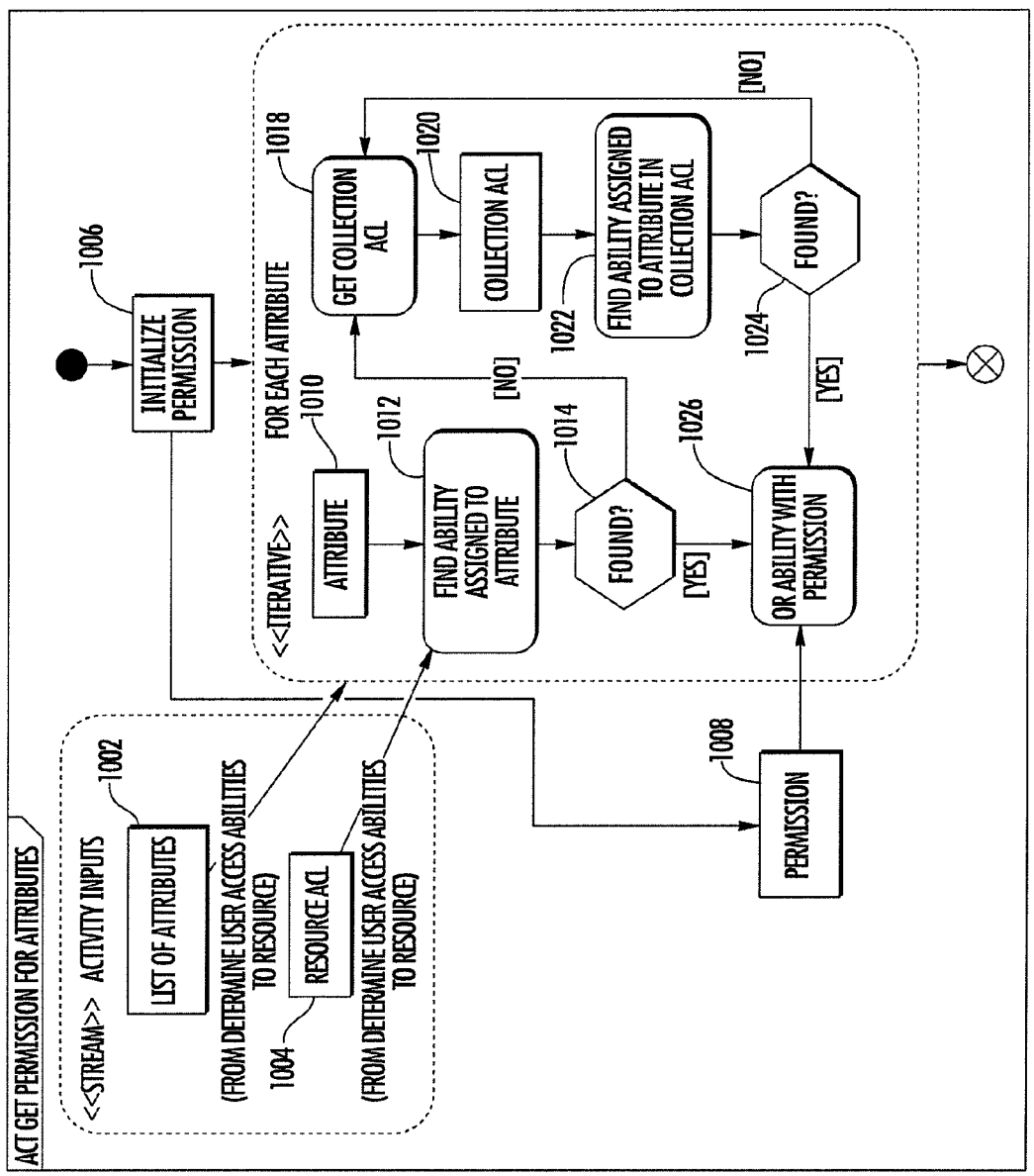
FIG. 10 illustrates a flowchart according to an example method for determining a permission according to an example embodiment of the invention.

Referring now to FIG. 10, FIG. 10 illustrates a flowchart according to an example method for determining a permission according to an example embodiment of the invention. In this regard, FIG. 10 illustrates operations that may collectively comprise operation 922 as illustrated in FIG. 9. The operations illustrated in and described with respect to FIG. 10 may, for example, be performed by, with the assistance of, and/or under the control of one or more of the processor 120, memory 122, communication interface 124, user interface 126, or access control unit 128.

The method illustrated in FIG. 10 may utilize a list of request attributes 1002 (e.g., the list of user's attributes determined in operation 910). The method illustrated in FIG. 10 may further utilize an ACL 1004 associated with a requested resource (e.g., the ACL accessed in operation 918). Operation 1006 may comprise initializing a permission 1008. The initialized permission may comprise an empty permission that does not yet contain any abilities (e.g., 0x00). Operations 1010-1024 may be performed iteratively for each request attribute in the list of attributes 1002.

Operation 1010 may comprise accessing a request attribute from the list of attributes 1002. Operations 1012 and 1014 may comprise comparing the request attribute to the access control attributes in the ACL 1004 and determining whether the ACL 1004 includes an access control attribute corresponding to the request attribute. This comparison may be performed using any appropriate comparison method, such as by using a string comparison (e.g., request attribute=access control attribute?), searching for an access control attribute corresponding to the request attribute in a comma separated list of access control attributes in the ACL 1004, or the like. The comparison method used may be selected based on the attribute type of the request attribute. In an instance in which the ACL 1004 is found to include an access control attribute corresponding to the request attribute, operation 1016 may comprise including an ability associated with the corresponding access control attribute in the permission 1008 by performing a logical OR operation to combine a value of the permission 1008 with a value of the ability.

In an instance in which the ACL 1004 does not include an access control attribute corresponding to the request attribute, the method may proceed to operation 1018, in which an ACL 1020 associated with a collection containing the resource may be accessed. Operations 1022 and 1024 may comprise comparing the request attribute to the access control attributes in the ACL 1020 and determining whether the ACL 1020 includes an access control attribute corresponding to the request attribute. In an instance in which the ACL 1020 is found to include an access control attribute corresponding to the request attribute, the method may proceed to operation 1016, in which an ability associated with the corresponding access control attribute may be added to the permission 1008 by performing a logical OR operation to combine a value of the permission 1008 with a value of the ability. In an instance in which the ACL 1020 does not include an access control attribute corresponding to the request attribute, the method may return to operation 1018 wherein a hierarchically higher order ACL associated with a hierarchically higher order containing collection may be accessed. In this regard, operations 1018-1024 may comprise iteratively accessing ACLs until a corresponding access control attribute is found or until an ACL associated with a root collection containing the resource is accessed.

One exception to operation 1016 as described is that in an instance in which one or more ability values are negative, the positive ability values may be accumulated in the permission 1008 and the negative ability values may be accumulated in a second permission mask (e.g., a negatePermission mask). After abilities associated with all request attributes in the list of attributes 1002 have been determined, the negatePermission mask may be used to remove abilities from the permission 1008, such as by performing a logical AND operation to combine the permission mask and the negatePermission mask.

Figure 11:
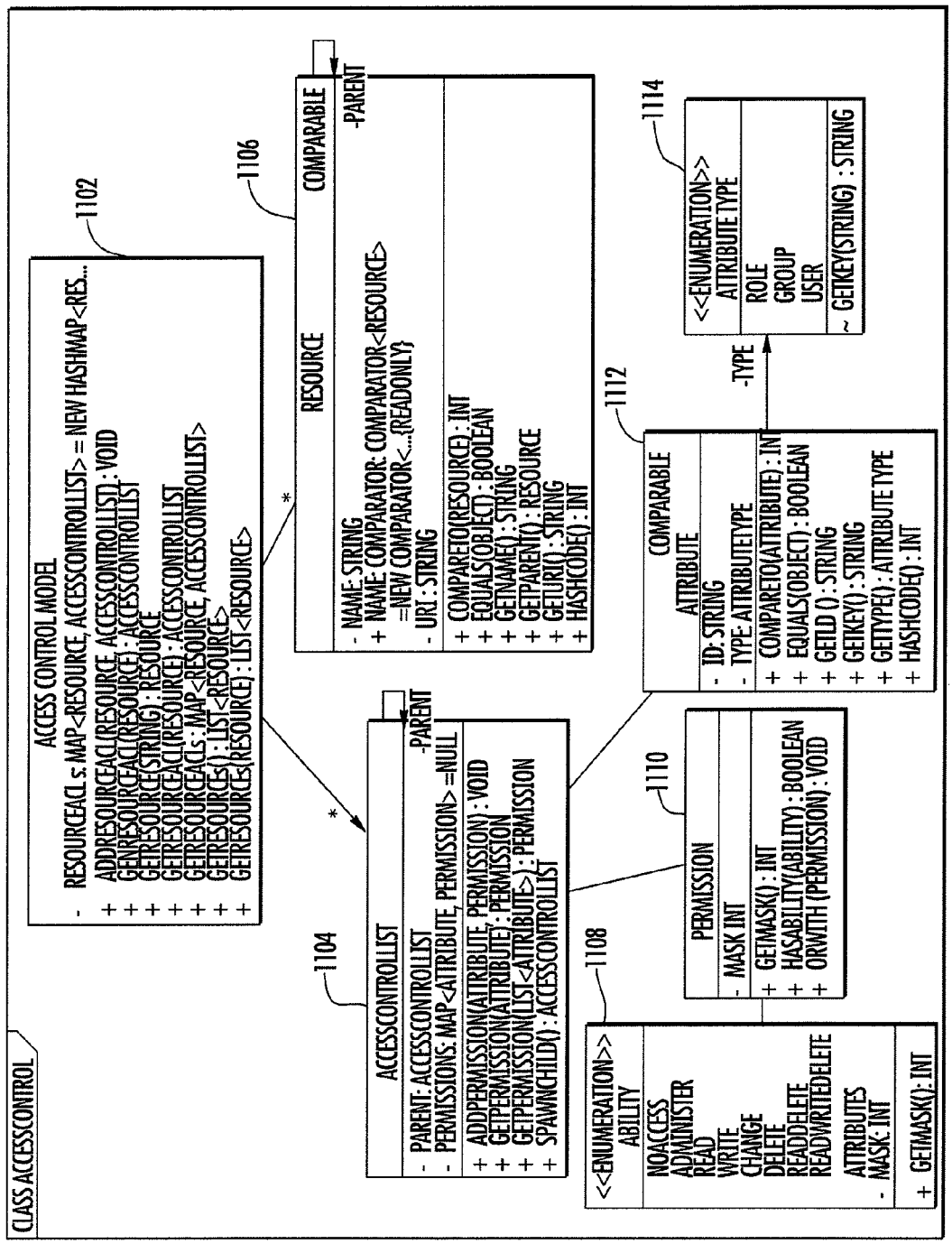
FIG. 11 illustrates a class diagram of an example implementation of an example embodiment of the invention.

FIG. 11 illustrates a class diagram of an example implementation of an example embodiment of the invention. In this regard, the classes 1102-114 may be respectively implemented as computer program products comprising a computer readable storage medium (e.g., the memory 122) storing computer readable program instructions executable by a processing device (e.g., the processor 120). In this example embodiment, AccessControlModel 1102 serves as a container of Resource 1106 and AccessControlList 1104 pairs. Resource 1106 may serve as a container of a resource's identifying and processing information and may include a link to a parent collection (which is also a Resource) containing the resource. AccessControlList 1104 may serve as a container of Attribute 1112 and Permission 1110 pairs. Attribute 1112 may serve to identify a unique attribute value within attributes of the same AttributeType 1114. Permission 1110 may contain a hex value that represents one or more Ability 1108 values.

Figure 12:
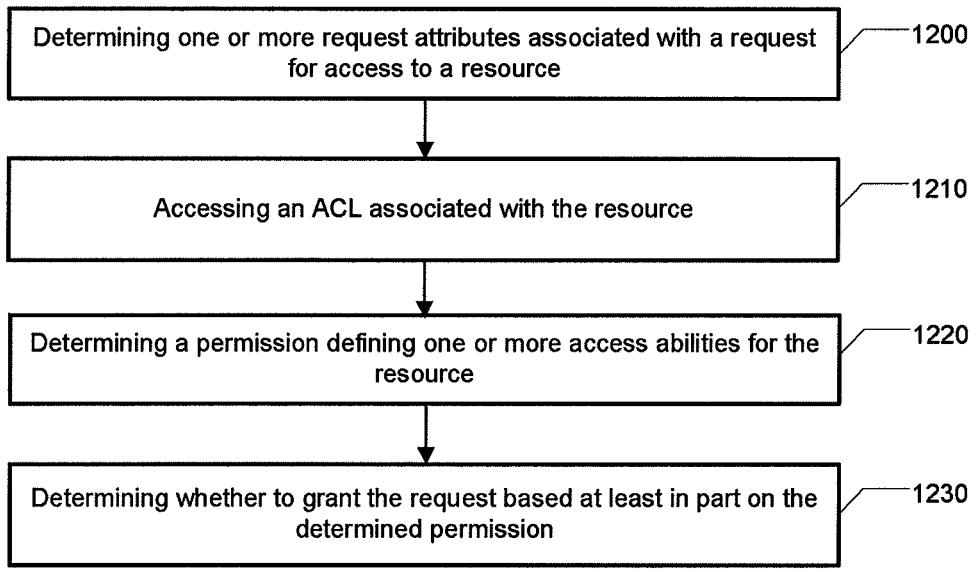
FIG. 12 illustrates a flowchart according to an example method for controlling access to a resource according to an example embodiment of the invention.

FIG. 12 illustrates a flowchart according to an example method for controlling access to a resource according to an example embodiment of the invention. The operations illustrated in and described with respect to FIG. 12 may, for example, be performed by, with the assistance of, and/or under the control of one or more of the processor 120, memory 122, communication interface 124, user interface 126, or access control unit 128. Operation 1200 may comprise determining one or more request attributes associated with a request for access to a resource. Operation 1210 may comprise accessing an ACL associated with the resource. Operation 1220 may comprise determining a permission defining one or more access abilities for the resource. In this regard, operation 1220 may comprise comparing the request attributes determined in operation 1200 to access control attribute(s) included in the ACL and, for any access control attribute corresponding to a request attribute, including an ability associated with the corresponding access control attribute in the permission. Operation 1230 may comprise determining whether to grant the request based at least in part on the determined permission.

Figure 13:
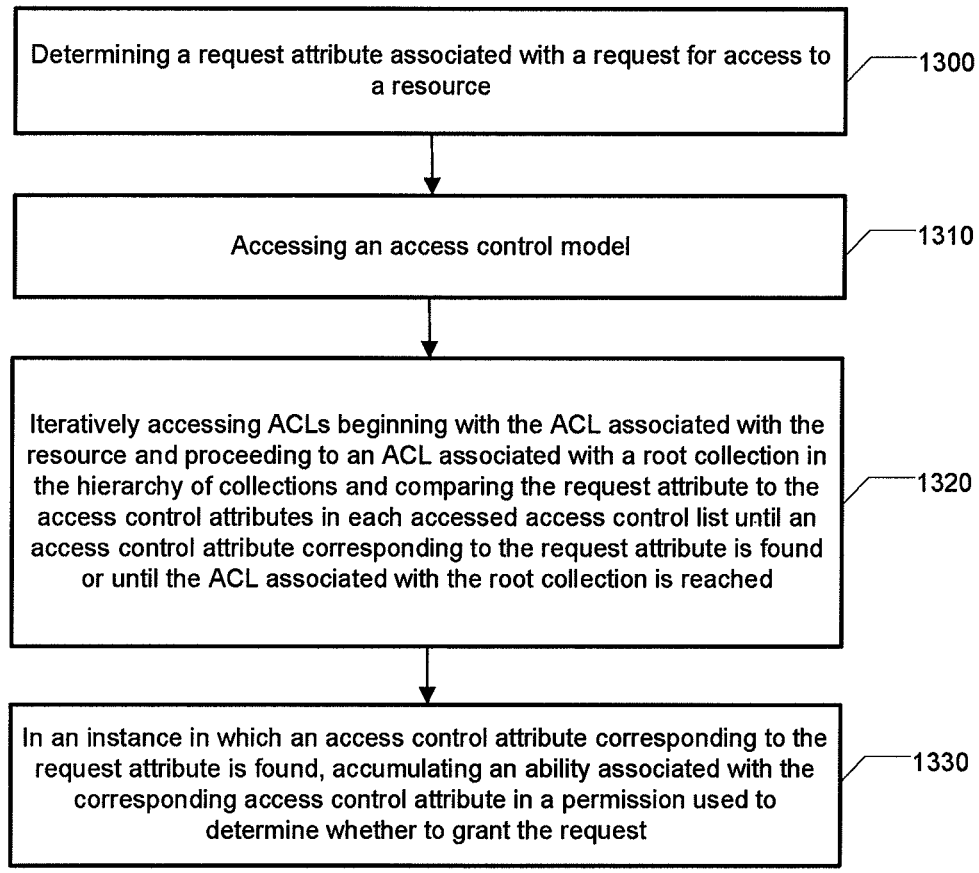
FIG. 13 illustrates a flowchart according to an example method for controlling access to a resource contained within a hierarchy of one or more collections according to an example embodiment of the invention.

FIG. 13 illustrates a flowchart according to an example method for controlling access to a resource contained within a hierarchy of one or more collections according to an example embodiment of the invention. The operations illustrated in and described with respect to FIG. 13 may, for example, be performed by, with the assistance of, and/or under the control of one or more of the processor 120, memory 122, communication interface 124, user interface 126, or access control unit 128. Operation 1300 may comprise determining a request attribute associated with a request for access to the resource. Operation 1310 may comprise accessing an access control model. The access control model may comprise a hierarchy of linked access control lists, which may comprise an access control list associated with the resource and one or more additional access control lists. Each additional access control list may be associated with a respective one of the one or more collections. Operation 1320 may comprise iteratively accessing the access control lists in the hierarchy of linked access control lists beginning with the access control list associated with the resource and proceeding to an access control list associated with a root collection in the hierarchy of collections and comparing the request attribute to the access control attributes in each accessed access control list until an access control attribute corresponding to the request attribute is found or until the access control list associated with the root collection is reached. Operation 1330 may comprise, in an instance in which an access control attribute corresponding to the request attribute is found, accumulating an ability associated with the corresponding access control attribute in a permission used to determine whether to grant the request.

FIGS. 4-10 and 12-13 each illustrate a flowchart of a system, method, and computer program product according to example embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server, desktop computer, laptop computer, mobile computer, or other computing device (e.g., the access control apparatus 102, user terminal 206, data source 306, combination thereof, and/or the like) and executed by a processor (e.g., the processor 120) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for controlling access to a resource, the method comprising:
   determining one or more request attributes associated with a request for access to a resource;
   accessing an access control list associated with the resource, wherein the access control list comprises one or more access control attributes associated with the resource, wherein the request for access to the resource comprises an indication of a uniform resource identifier uniquely identifying the resource and accessing the access control list comprises using the uniform resource identifier to access the access control list associated with the resource;
   determining, by a processor, a permission defining one or more access abilities for the resource at least in part by comparing request attributes to the access control attributes and, for any access control attribute corresponding to a request attribute, including an ability associated with the corresponding access control attribute in the permission, wherein determining the permission comprises determining at least one permission mask and including an ability associated with the corresponding access control attribute in the permission comprises performing a logical OR operation on the ability associated with the corresponding access control attribute and one of the at least one permission mask, thereby accumulating the ability associated with the corresponding access control attribute in the permission, wherein determining at least one permission mask further comprises determining a first permission mask used for accumulation of positive abilities and a second permission mask used for accumulation of negative abilities, and wherein determining the permission further comprises performing a logical AND operation on the first permission mask and the second permission mask; and
   determining whether to grant the request based at least in part on the determined permission.

2. The method of claim 1, wherein the request for access to the resource requires an ability, and wherein determining whether to grant the request comprises:
   comparing the ability required for the request to the determined permission to determine whether the ability required for the request is included within the determined permission;
   in an instance in which the ability required for the request is included within the determined permission, determining to grant the request; and
   in an instance in which the ability required for the request is not included within the determined permission, determining to deny the request.

3. The method of claim 2, wherein the determined permission comprises a permission mask and comparing the ability required for the request to the determined permission comprises performing a logical AND operation on the ability required for the request and the permission mask to determine whether the ability required for the request is included within the permission mask.

4. The method of claim 1, wherein in an instance in which an ability associated with an access control attribute corresponding to a request attribute comprises a negative ability, including the ability associated with the corresponding access control attribute in the permission comprises removing the ability from the permission in an instance in which the permission includes the ability.

5. The method of claim 1, wherein accessing the access control list comprises accessing the access control list from a cached access control model.

6. The method of claim 1, wherein the request for access to the resource comprises an indication of a uniform resource identifier uniquely identifying the resource and accessing the access control list comprises using the uniform resource identifier to access the access control list associated with the resource.

7. The method of claim 1, wherein the request for access to the resource is initiated by a user, and wherein the request attributes comprise user attributes associated with the user.

8. The method of claim 1, wherein the resource is contained in a collection and the access control list associated with the resource further comprises a link to an access control list associated with the collection, and wherein determining a permission defining one or more access abilities for the resource comprises:
   comparing a request attribute to one or more access control attributes in the access control list associated with the resource to determine whether the access control list associated with the resource comprises an access control attribute corresponding to the request attribute;
   in an instance in which the access control list associated with the resource comprises an access control attribute corresponding to the request attribute, including an ability associated with the corresponding access control attribute in the permission; and
   in an instance in which the access control list associated with the resource does not comprise an access control attribute corresponding to the request attribute, using the link to access the access control list associated with the collection and comparing the request attribute to one or more access control attributes in the access control list associated with the collection.

9. The method of claim 8, wherein the resource is contained within a hierarchy of one or more collection, and wherein:
   accessing an access control list associated with the resource comprises accessing the access control list associated with the resource from an access control model comprising a hierarchy of linked access control lists, wherein the hierarchy of linked access control lists comprises the access control list associated with the resource and one or more additional access control lists, wherein each additional access control list is associated with a respective one of the one or more collections, and wherein each access control list in the hierarchy of linked access control lists comprises one or more access control attributes; and
   in an instance in which the access control list associated with the resource does not comprise an access control attribute corresponding to the request attribute, determining a permission defining one or more access abilities for the resource further comprises:
      iteratively accessing the additional access control lists in the hierarchy of linked access control lists beginning with an access control list associated with a lowest order collection containing the resource and proceeding to an access control list associated with a root collection in the hierarchy of collections and comparing the request attribute to the access control attributes in each accessed access control list until an access control attribute corresponding to the request attribute is found or until the access control list associated with the root collection is reached; and in an instance in which an access control attribute corresponding to the request attribute is found, accumulating an ability associated with the corresponding access control attribute in the permission.

10. An apparatus for controlling access to a resource, the apparatus comprising at least one processor, wherein the at least one processor causes the apparatus to:

determine one or more request attributes associated with a request for access to a resource;

access an access control list associated with the resource, wherein the access control list comprises one or more access control attributes associated with the resource, wherein the request for access to the resource comprises an indication of a uniform resource identifier uniquely identifying the resource, and wherein the at least one processor is to cause the apparatus to access the access control list by using the uniform resource identifier to access the access control list associated with the resource;

determine a permission defining one or more access abilities for the resource at least in part by comparing the request attributes to the access control attributes and, for any access control attribute corresponding to a request attribute, including an ability associated with the corresponding access control attribute in the permission, wherein determining the permission comprises determining at least one permission mask and including an ability associated with the corresponding access control attribute in the permission comprises performing a logical OR operation on the ability associated with the corresponding access control attribute and one of the at least one permission mask, thereby accumulating the ability associated with the corresponding access control attribute in the permission, wherein determining at least one permission mask further comprises determining a first permission mask used for accumulation of positive abilities and a second permission mask used for accumulation of negative abilities, and wherein determining the permission further comprises performing a logical AND operation on the first permission mask and the second permission mask; and determine whether to grant the request based at least in part on the determined permission.

11. The apparatus of claim 10, wherein the request for access to the resource requires an ability, and wherein the at least one processor causes the apparatus to determine whether to grant the request by:

comparing the ability required for the request to the determined permission to determine whether the ability required for the request is included within the determined permission;

in an instance in which the ability required for the request is included within the determined permission, determining to grant the request; and in an instance in which the ability required for the request is not included within the determined permission, determining to deny the request.

12. The apparatus of claim 10, wherein the determined permission comprises a permission mask, and wherein the at least one processor is configured to cause the apparatus to compare the ability required for the request to the determined permission by performing a logical AND operation on the ability required for the request and the permission mask to determine whether the ability required for the request is included within the permission mask.

13. The apparatus of claim 10, wherein in an instance in which an ability associated with an access control attribute corresponding to a request attribute comprises a negative ability, the at least one processor is configured to cause the apparatus to include the ability associated with the corresponding access control attribute in the permission by removing the ability from the permission in an instance in which the permission includes the ability.

14. The apparatus of claim 10, wherein the at least one processor causes the apparatus to access the access control list by accessing the access control list from a cached access control model.

15. The apparatus of claim 10, wherein the request for access to the resource comprises an indication of a uniform resource identifier uniquely identifying the resource, and wherein the at least one processor is configured to cause the apparatus to access the access control list by using the uniform resource identifier to access the access control list associated with the resource.

16. The apparatus of claim 10, wherein the request for access to the resource is initiated by a user, and wherein the request attributes comprise user attributes associated with the user.

17. The apparatus of claim 10, wherein the resource is contained in a collection and the access control list associated with the resource further comprises a link to an access control list associated with the collection, and wherein the at least one processor is configured to cause the apparatus to determine a permission defining one or more access abilities for the resource at least in part by:

comparing a request attribute to one or more access control attributes in the access control list associated with the resource to determine whether the access control list associated with the resource comprises an access control attribute corresponding to the request attribute;

in an instance in which the access control list associated with the resource comprises an access control attribute corresponding to the request attribute, including an ability associated with the corresponding access control attribute in the permission; and in an instance in which the access control list associated with the resource does not comprise an access control attribute corresponding to the request attribute, using the link to access the access control list associated with the collection and comparing the request attribute to one or more access control attributes in the access control list associated with the collection.

18. The apparatus of claim 17, wherein the resource is contained within a hierarchy of one or more collection, and wherein the at least one processor causes the apparatus to:

access an access control list associated with the resource by accessing the access control list associated with the resource from an access control model comprising a hierarchy of linked access control lists, wherein the hierarchy of linked access control lists comprises the access control list associated with the resource and one or more additional access control lists, wherein each additional access control list is associated with a respective one of the one or more collections, and wherein each access control list in the hierarchy of linked access control lists comprises one or more access control attributes; and in an instance in which the access control list associated with the resource does not comprise an access control attribute corresponding to the request attribute, determine a permission defining one or more access abilities for the resource at least in part by:
- iteratively accessing the additional access control lists in the hierarchy of linked access control lists beginning with an access control list associated with a lowest order collection containing the resource and proceeding to an access control list associated with a root collection in the hierarchy of collections and comparing the request attribute to the access control attributes in each accessed access control list until an access control attribute corresponding to the request attribute is found or until the access control list associated with the root collection is reached; and
- in an instance in which an access control attribute corresponding to the request attribute is found, accumulating an ability associated with the corresponding access control attribute in the permission.

19. The apparatus of claim 10, further comprising at least one memory storing instructions that when executed by the at least one processor cause the apparatus to:
- determine one or more request attributes associated with a request for access to the resource;
- access an access control list associated with the resource, wherein the access control list comprises one or more access control attributes associated with the resource;
- determine a permission defining one or more access abilities for the resource at least in part by comparing the request attributes to the access control attributes and, for any access control attribute corresponding to a request attribute, including an ability associated with the corresponding access control attribute in the permission; and
- determine whether to grant the request based at least in part on the determined permission.

20. A computer program product for controlling access to a resource, the computer program product comprising at least one non-transitory computer-readable storage medium having computer-readable program instructions stored therein, the computer-readable program instructions comprising:
- program instructions to determine one or more request attributes associated with a request for access to a resource;
- program instructions to access an access control list associated with the resource, wherein the access control list comprises one or more access control attributes associated with the resource, wherein the request for access to the resource comprises an indication of a uniform resource identifier uniquely identifying the resource, and wherein the at least one processor is to cause the apparatus to access the access control list by using the uniform resource identifier to access the access control list associated with the resource;
- program instructions to determine a permission defining one or more access abilities for the resource at least in part by comparing the request attributes to the access control attributes, for any access control attribute corresponding to a request attribute, including an ability associated with the corresponding access control attribute in the permission, wherein determining the permission comprises determining at least one permission mask and including an ability associated with the corresponding access control attribute in the permission comprises performing a logical OR operation on the ability associated with the corresponding access control attribute and one of the at least one permission mask, thereby accumulating the ability associated with the corresponding access control attribute in the permission, wherein determining at least one permission mask further comprises determining a first permission mask used for accumulation of positive abilities and a second permission mask used for accumulation of negative abilities, and wherein determining the permission further comprises performing a logical AND operation on the first permission mask and the second permission mask; and
- program instructions to determine whether to grant the request based at least in part on the determined permission.

21. The computer program product of claim 20, wherein the request for access to the resource requires an ability, and wherein the program instructions configured to determine whether to grant the request comprise:
- program instructions to compare the ability required for the request to the determined permission to determine whether the ability required for the request is included within the determined permission;
- program instructions, in an instance in which the ability required for the request is included within the determined permission, to determine to grant the request; and
- program instructions, in an instance in which the ability required for the request is not included within the determined permission, to determine to deny the request.

22. The computer program product of claim 20, wherein the resource is contained in a collection and the access control list associated with the resource further comprises a link to an access control list associated with the collection, and wherein the program instructions to determine a permission defining one or more access abilities for the resource comprise:
- program instructions to compare a request attribute to one or more access control attributes in the access control list associated with the resource to determine whether the access control list associated with the resource comprises an access control attribute corresponding to the request attribute;
- program instructions, in an instance in which the access control list associated with the resource comprises an access control attribute corresponding to the request attribute, to include an ability associated with the corresponding access control attribute in the permission; and
- program instructions, in an instance in which the access control list associated with the resource does not comprise an access control attribute corresponding to the request attribute, to use the link to access the access control list associated with the collection and comparing the request attribute to one or more access control attributes in the access control list associated with the collection.

\* \* \* \* \*